US012280839B2

(12) United States Patent
Mancini et al.

(10) Patent No.: US 12,280,839 B2
(45) Date of Patent: Apr. 22, 2025

(54) VEHICLE TRACK SYSTEM AND ASSEMBLY FOR OFF-ROAD CONDITIONS

(71) Applicant: HELLTRAXX, LLC, Sterling Heights, MI (US)

(72) Inventors: Steven Mancini, Clinton Township, MI (US); Jerome Penxa, Shelby Township, MI (US)

(73) Assignee: HELLTRAXX, LLC, Sterling Heights, MI (US)

(*) Notice: Subject to any disclaimer, the term of this patent is extended or adjusted under 35 U.S.C. 154(b) by 951 days.

(21) Appl. No.: 17/323,174

(22) Filed: May 18, 2021

(65) Prior Publication Data
US 2021/0354768 A1 Nov. 18, 2021

Related U.S. Application Data

(60) Provisional application No. 63/026,349, filed on May 18, 2020.

(51) Int. Cl.
B62D 55/084 (2006.01)
B62D 55/065 (2006.01)
(Continued)

(52) U.S. Cl.
CPC ......... B62D 55/084 (2013.01); B62D 55/065 (2013.01); B62D 55/10 (2013.01);
(Continued)

(58) Field of Classification Search
CPC ...... B62D 55/04; B62D 55/10; B62D 55/125; B62D 55/26; B62D 55/065; B62D 55/655;
(Continued)

(56) References Cited

U.S. PATENT DOCUMENTS 3,412,821 A 11/1968 Humphrey
3,667,562 A * 6/1972 Compton ............... B62K 13/00
180/184

(Continued)

FOREIGN PATENT DOCUMENTS

CA 2980208 A1 3/2019
RU 174334 U1 10/2017

OTHER PUBLICATIONS

International Preliminary Report on Patentability for International Application No. PCT/US2021/032918 dated Nov. 17, 2022 (7 pages).

(Continued)

Primary Examiner — Anne Marie M Boehler
(74) Attorney, Agent, or Firm — REISING ETHINGTON, P.C.

(57) ABSTRACT

A vehicle track system and assembly for outfitting vehicles for mobility in off-road conditions. Snow, mud, muck, soil, sand, ice, and other fickle conditions are more readily traversed. In an example, a hub assembly, a pair of drivers, a frame, a pair of rails, and a pair of tracks are all part of the vehicle track system and assembly. The drivers are incited to rotate by the hub assembly. The frame has multiple sets of frame members that are connected to the rails. And the tracks are furnished with numerous paddles and are driven to move via the drivers.

21 Claims, 15 Drawing Sheets

(51) Int. Cl.
  *B62D 55/10* (2006.01)
  *B62D 55/125* (2006.01)
  *B62D 55/24* (2006.01)
  *B62D 55/26* (2006.01)

(52) U.S. Cl.
  CPC ......... *B62D 55/125* (2013.01); *B62D 55/244* (2013.01); *B62D 55/26* (2013.01)

(58) Field of Classification Search
  CPC ... B62D 55/084; B62D 55/244; B62D 55/104
  USPC ......... 180/9.21, 9.26, 9.5, 9.1, 192; 305/127
  See application file for complete search history.

(56) References Cited

U.S. PATENT DOCUMENTS

| | | | | |
|---|---|---|---|---|
| 3,689,123 | A * | 9/1972 | Barbieri | B62D 55/04 180/9.5 |
| 3,737,001 | A | 6/1973 | Rasenberger | |
| 3,773,126 | A * | 11/1973 | Irvine | B62M 27/02 305/168 |
| 4,546,842 | A * | 10/1985 | Yasui | B62D 55/07 305/168 |
| 6,006,847 | A * | 12/1999 | Knight | B62D 55/04 180/9.26 |
| 6,095,275 | A * | 8/2000 | Shaw | B62M 27/02 180/185 |
| 6,112,840 | A * | 9/2000 | Forbes | B62M 27/02 180/193 |
| 7,594,557 | B2 * | 9/2009 | Polakowski | B62M 27/02 305/128 |
| 10,266,215 | B2 | 4/2019 | Jean et al. | |
| 10,392,060 | B2 | 8/2019 | Dandurand et al. | |
| 10,940,902 | B2 * | 3/2021 | Marchildon | B62D 55/084 |
| 2006/0060395 | A1 | 3/2006 | Boivin et al. | |
| 2015/0136497 | A1 | 5/2015 | Morin | |
| 2015/0183464 | A1 * | 7/2015 | Mannering | B62D 55/084 180/9.46 |
| 2015/0291234 | A1 | 10/2015 | Zuchoski et al. | |
| 2016/0016639 | A1 | 1/2016 | Pard | |
| 2017/0233018 | A1 * | 8/2017 | Buchanan | B62D 55/02 305/125 |
| 2018/0265146 | A1 | 9/2018 | Laplante et al. | |
| 2019/0092405 | A1 | 3/2019 | Dandurand | |
| 2019/0248432 | A1 | 8/2019 | Gagne et al. | |

OTHER PUBLICATIONS

International Search Report and Written Opinion for International Application No. PCT/US21/32918 dated Aug. 16, 2021 (22 pages).

* cited by examiner

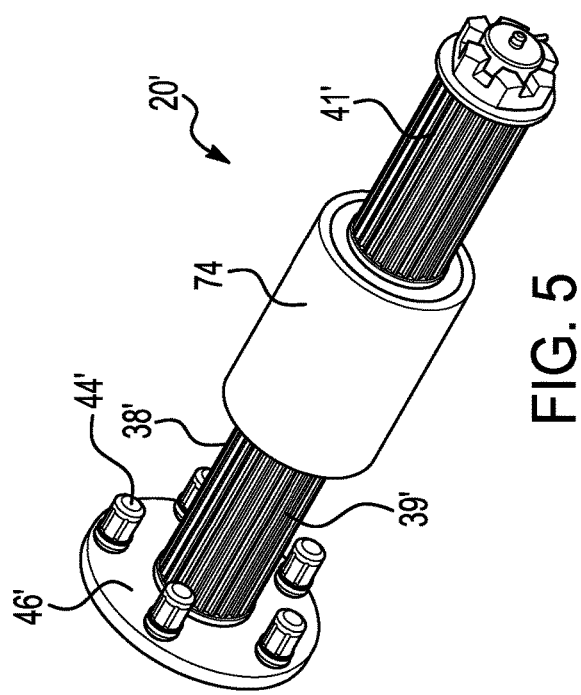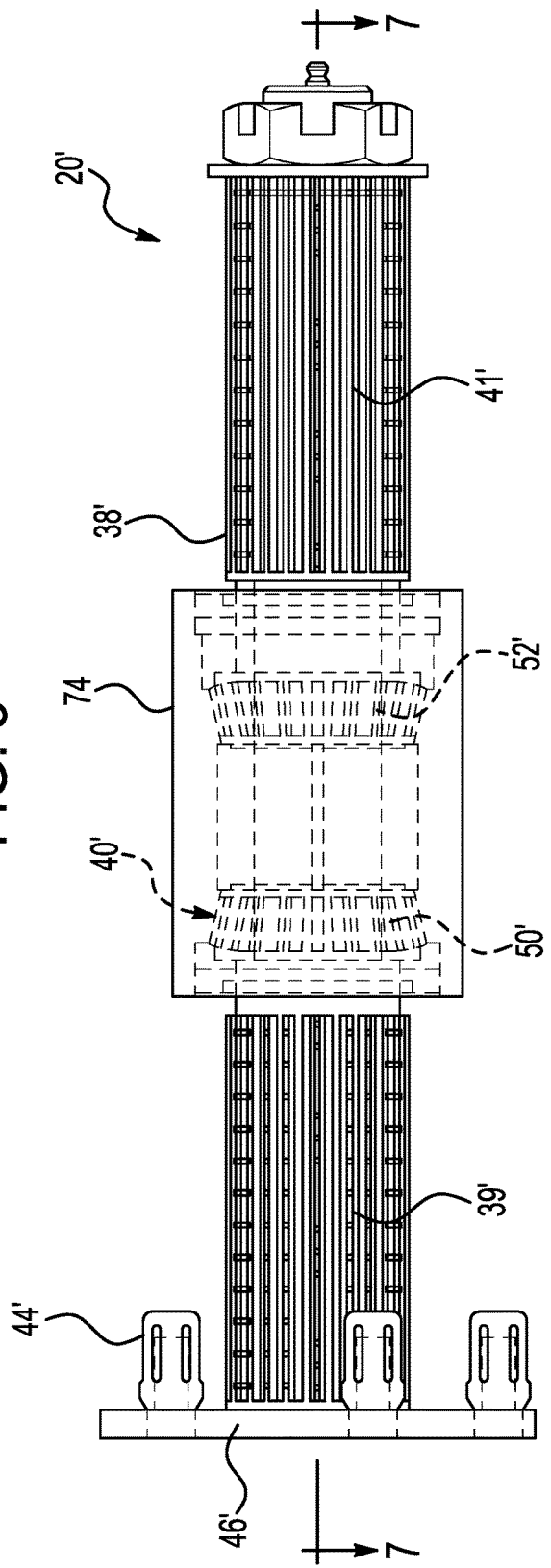

VEHICLE TRACK SYSTEM AND ASSEMBLY FOR OFF-ROAD CONDITIONS

CROSS-REFERENCE TO RELATED APPLICATION

This patent application claims the benefit of U.S. Provisional Patent Application No. 63/026,349, filed on May 18, 2020.

TECHNICAL FIELD

This disclosure relates generally to track systems and assemblies that outfit vehicles for mobility in off-road conditions.

BACKGROUND

Vehicle track systems and assemblies are typically employed to enable vehicles to more easily traverse conditions and grounds that are unsteady and less certain. Snow, mud, muck, soil, sand, and ice are examples of such conditions. The systems and assemblies are intended to provide improved traction and, in some instances, floatation of the vehicle. Automobiles like sport utility vehicles (SUVs), all-terrain vehicles (ATVs), utility vehicles, and recreation vehicles, among others, can be equipped with vehicle track systems and assemblies. In the case of automobiles, the vehicle track systems and assemblies are commonly retrofitted on the automobiles and installed in place of its wheels. In the case of other vehicles, in contrast, the vehicle track systems and assemblies can be a part of the original equipment of the vehicles.

SUMMARY

In an embodiment, a vehicle track assembly for off-road conditions is provided. The vehicle track assembly may include a hub assembly, a first driver, a second driver, a frame, a first rail, a second rail, a first track, and a second track. The first driver is carried by the hub assembly and can rotate with the hub assembly. The second driver is carried by the hub assembly and can rotate with the hub assembly. The frame spans from the hub assembly. The frame has a first set of frame members and has a second set of frame members. The first rail is connected to the first set of frame members. The second rail is connected to the second set of frame members. The first track has multiple first paddles. The first track is driven to move by way of the first driver, and is guided over the first rail. The second track has multiple second paddles. The second track is driven to move by way of the second driver, and is guided over the second rail.

In another embodiment, a vehicle track assembly for off-road conditions is provided. The vehicle track assembly may include a spindle, one or more sets of bearings, a frame, a first driver, a second driver, a first rail, a second rail, a first track, and a second track. The frame has a base hub. The base hub houses a section or more of the spindle, and houses the set(s) of bearings. The frame extends from the base hub. The first driver can rotate with the spindle. The second driver can rotate with the spindle. The first rail is connected to the frame. The second rail is connected to the frame. The first track has multiple first paddles. The first track is driven to move by way of the first driver. The second track has multiple second paddles. The second track is driven to move by way of the second driver.

In yet another embodiment, a vehicle track hub assembly is provided. The vehicle track hub assembly may include a spindle, a frame base hub, a first set of bearings, a second set of bearings, a first driver, and a second driver. The first set of bearings is situated radially between the spindle and the frame base hub. The second set of bearings is situated radially between the spindle and the fame base hub. The first driver can rotate with the spindle. The second driver can rotate with the spindle. In an assembled state, the first set of bearings is axially overlapped by the first driver, and the second set of bearings is positioned axially outboard of the first set of bearings.

BRIEF DESCRIPTION OF DRAWINGS

The following detailed description of an embodiment is set forth with reference to the accompanying drawings, in which:

FIG. 5 is a perspective view of an embodiment of a hub assembly of the vehicle track assembly;

FIG. 6 is side view of the hub assembly, showing a section in phantom;

DETAILED DESCRIPTION OF EMBODIMENTS

The figures present embodiments of a vehicle track system 10 and a vehicle track assembly 12 for outfitting vehicles for mobility in off-road conditions where grounds can be unsteady and less certain. The vehicle track system 10 and assembly 12 can be retrofitted on a vehicle or can be installed as part of the original equipment of a vehicle. Snow, mud, muck, soil, sand, and ice are example off-road conditions over which the system 10 and assembly 12 can improve traction and floatation of the accompanying vehicle. These conditions can exist in mountainous terrain, farmland, peatland, construction sites, and other environments. The term "vehicle" is intended to have an expansive meaning and includes automobiles like sport utility vehicles (SUVs) and trucks, as well as all-terrain vehicles (ATVs), utility vehicles, and recreation vehicles, among other types of vehicles. The vehicle track system 10 and assembly 12 outperforms previously-known track systems and assemblies. It has a lightweight, high strength construction. To more readily travel over more extreme conditions than past systems and assemblies—such as deep powder snow depths of ten feet and more—the vehicle track assembly 12 has a dual-track arrangement. The dual-track arrangement, as well as its other designs and constructions, are presented below in more detail with reference to the figures.

As used herein, and unless otherwise specified, the terms radially, axially, and circumferentially, and their grammatical variations refer to directions with respect to the generally circular and cylindrical shape of many of the components of the vehicle track assembly 12. Further, and unless otherwise specified, the term axial inboard refers to a direction AI, an example of which is provided in FIG. 20; and the term axial outboard refers to a direction AO, an example of which is provided in FIG. 20.

Figure 1:
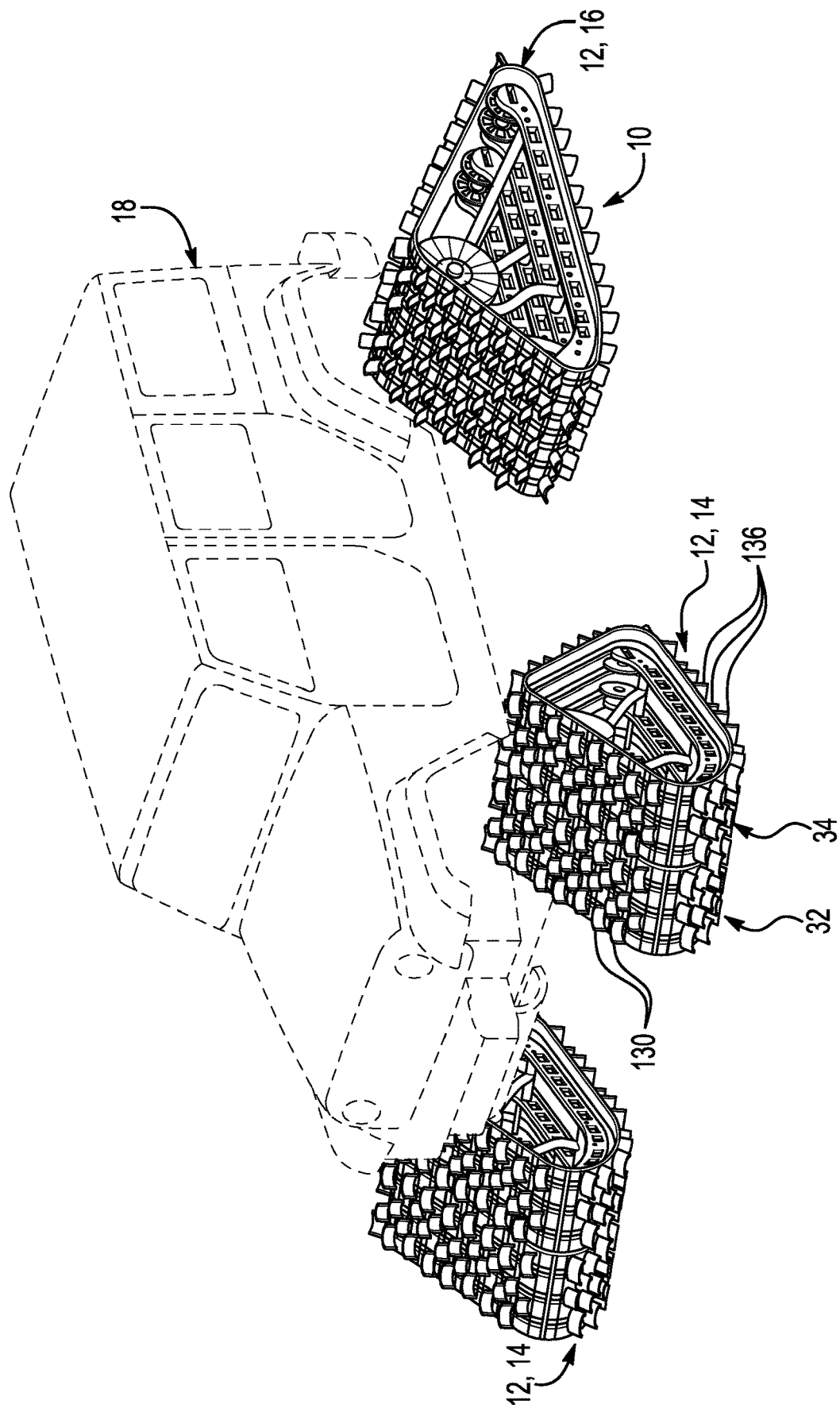
FIG. 1 depicts an embodiment of a vehicle track system for off-road conditions, the system shown retrofitted on an automobile.

Depending on the application, the vehicle track system 10 can include multiple vehicle track assemblies 12 installed and situated at a forward end, a rearward end, and/or a middle region of the particular vehicle. In the embodiment of FIG. 1, for example, the vehicle track system 10 includes a total of four individual vehicle track assemblies 12: a pair of front end vehicle track assemblies 14 and a pair of rear end vehicle track assemblies 16 (only one rear end vehicle track assembly is visible in the perspective view of FIG. 1). The front end and rear end vehicle track assemblies 14, 16 have similar designs and constructions in the embodiment presented, but in other embodiments could have different designs and constructions. Because of their similar designs and constructions, many of the descriptions of the front end vehicle track assembly 14 of FIGS. 2-11 apply to the rear end vehicle track assembly 16, and hence the descriptions referencing FIGS. 2-11 are generalized to a vehicle track assembly 12 whether intended for installation at a forward end, a rearward end, and/or a mid-region. In FIG. 1, the vehicle track assemblies 12, both front end and rear end, are retrofitted on an automobile 18 and replace its four wheels. The automobile 18 presented is a sport utility vehicle, as an example.

The vehicle track assembly 12 can have different designs, constructions, and components in various embodiments, depending on the particular application and accompanying vehicle and, in some cases, depending on the particular axle that the vehicle track assembly 12 is mounted to. In the embodiment of FIGS. 2-11, the vehicle track assembly 12 includes a hub assembly 20, a first driver 22, a second driver 24, a frame 26, a first rail 28, a second rail 30, a first track 32, and a second track 34.

The hub assembly 20 mounts the vehicle track assembly 12 to a vehicle component and is driven to rotate by the vehicle component and, in turn, incites rotation of the first and second drivers 22, 24. The vehicle component could be a rotor or a caliper or another component in the case of the automobile 18, or could be another type of component of another vehicle. The precise mounting can largely be dictated by the particular vehicle application. The hub assembly 20 can have different designs, constructions, and components in various embodiments. A first embodiment is presented in the sectional views of FIGS. 3 and 4. Here, a rotor 36 of the automobile 18 is depicted and the hub assembly 20 generally includes, as its main components, a spindle 38, a bearing assembly 40, and a hub 42.

The spindle 38 is mounted directly to the rotor 36 via a set of lug nuts 44 at a flanged end 46 of the spindle 38. The vehicle track assembly 12 is bolted on the rotor 36 via the set of lug nuts 44. Opposite the flanged end 46 across the spindle's elongated extent, the spindle 38 has a set of external splines for engagement with a set of internal splines of the hub 42. The spindle 38 is driven to rotate via its mounting with the rotor 36, and the spindle 38 in turn drives rotation of the hub 42 via engagement between the set of external splines and the set of internal splines. A lubricant passage 48 spans along a central axis of the spindle 38 for the introduction of lubricant to the bearing assembly 40. The bearing assembly 40 facilitates relative revolving movement between the hub assembly 20 and the frame 26. It particularly permits the spindle 38 to rapidly rotate amid use of the vehicle track assembly 12 with respect to, and independent of, a base hub component (subsequently introduced) of the frame 26 which encircles the spindle 38 and serves as an enclosure of the bearing assembly 40. The bearing assembly 40 includes a first set of bearings 50 and a second set of bearings 52, although it could include more or less sets of bearings in other embodiments. The first and second set of bearings 50, 52 are secured to the spindle 38, and are situated and sandwiched radially between the spindle 38 and the base hub component. The second set of bearings 52 is located axially outboard of the first set of bearings 50. The first and second set of bearings 50, 52 include multiple individual rollers abutting and rolling against an interior of the base hub component. The rollers can be held by cages. The hub 42 mounts to the spindle 38 via the splined engagement and accepts mounting of the second driver 24. In particular, the hub 42 has a cylindrical body that mounts to the spindle 38 and has a radially-outwardly extending flange that receives mounting of the second driver 24. The mounting between the flange and second driver 24 can involve bolting. Still, the hub assembly 20 can include more, less, and/or different main components and subcomponents in its construction than those described here. For example, the hub assembly 20 can include seals at the bearing assembly 40, spacers between components, and a washer and nut to secure mounting between the hub 42 and spindle 38.

The location of the bearing assembly 40 with respect to the first and second drivers 22, 24 and with respect to the first and second tracks 32, 34 serves to facilitate the use of dual drivers and dual tracks in the vehicle track assembly 12 according to some embodiments. In this embodiment, and as perhaps demonstrated best by FIGS. 3 and 4, the bearing assembly 40 and its first and second bearings 50, 52 are located and positioned at an approximate axial mid-region M (example depicted in FIG. 4) as established by the first and second drivers 22, 24 and/or as established by the first and second tracks 32, 34. The axial mid-region M can refer to an axial or longitudinal locality relative to the first and second drivers 22, 24 and/or relative to the first and second tracks 32, 34 (axial is used here relative to the circular and cylindrical shapes of the first and second drivers 22, 24). The precise location and axial extent of the axial mid-region M can vary in different embodiments (again, axial is used here relative to the circular and cylindrical shapes of the first and second drivers 22, 24). Stated another way, the bearing assembly 40 and the first and second bearings 50, 52 are axially sandwiched and interposed between the first and second drivers 22, 24 and the first and second tracks 32, 34. Since the frame 26 extends from the hub assembly 20 adjacent the bearing assembly 40 and at the axial mid-region M, this location and position may establish a center of load-bearing with suitable proximity to the rotor 36 to effectively endure loads exerted by the accompanying vehicle and exerted amid use of the vehicle track assembly 12, while accommodating an overall diameter of the spindle 38 that is suitable and practical for application purposes. Dual drivers and dual tracks may hence be more readily employed in the vehicle track assembly 12. Still, the location and position of the bearing assembly 40 with respect to the first and second drivers 22, 24 and with respect to the first and second tracks 32, 34 could be elsewhere in other embodiments.

Figure 7:
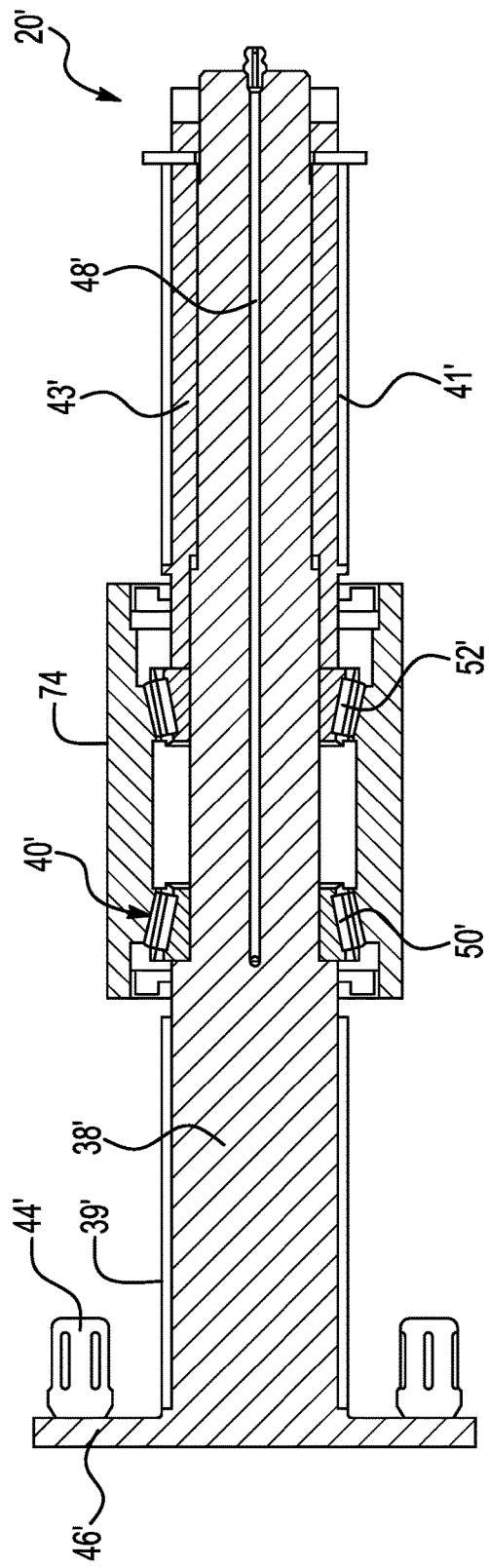
FIG. 7 is a sectional view of the hub assembly taken at arrowed line 7-7 in FIG. 6.

A second embodiment of the hub assembly 20' is presented in FIGS. 5-7. This embodiment is also intended for mounting to the rotor 36 of the automobile 18. The spindle 38' is mounted directly to the rotor 36 via the set of lug nuts 44' at the flanged end 46'. The vehicle track assembly 12 is bolted on the rotor 36 via the set of lug nuts 44'. The spindle 38' has a first set of external splines 39' residing over a first extent thereof and has a second set of external splines 41' residing over a second extent thereof. The first and second set of external splines 39', 41' are located on opposite ends of the elongated extent of the spindle's body and straddle both sides of the bearing assembly 40'. The first and second set of external splines 39', 41' respectively engage with corresponding sets of internal splines of the first and second drivers 22, 24. The second set of external splines 41' resides on a sleeve 43' that is inserted over the spindle's body and secured thereon. The sleeve 43' facilitates installation of the bearing assembly 40' and its components over the spindle 38'. The lubricant passage 48' spans along the spindle's central axis for introducing lubricant to the bearing assembly 40'. As before, the bearing assembly 40' permits the spindle 38' to rapidly rotate amid use of the vehicle track assembly 12 with respect to, and independent of, the frame's base hub component. The bearing assembly 40' includes the first set of bearings 50' and includes the second set of bearings 52'. Caged rollers of the first and second sets of bearings 50', 52' can roll against the base hub component's interior.

Figure 14:
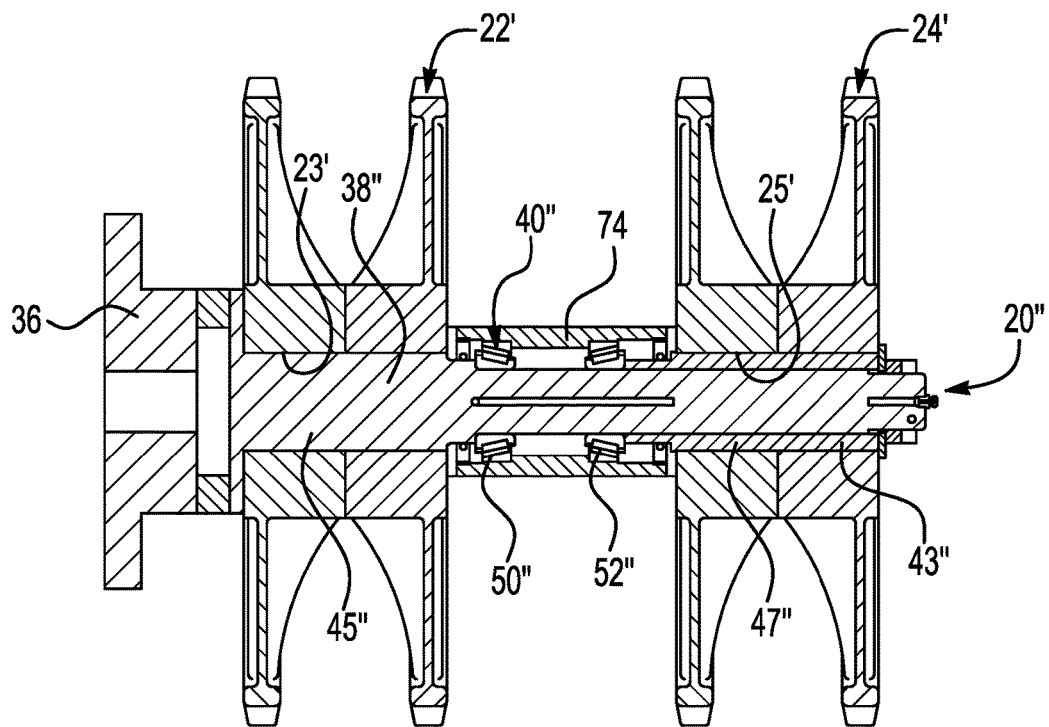
FIG. 14 is a sectional view of an embodiment of a hub assembly of the vehicle track assembly.
Figure 15:
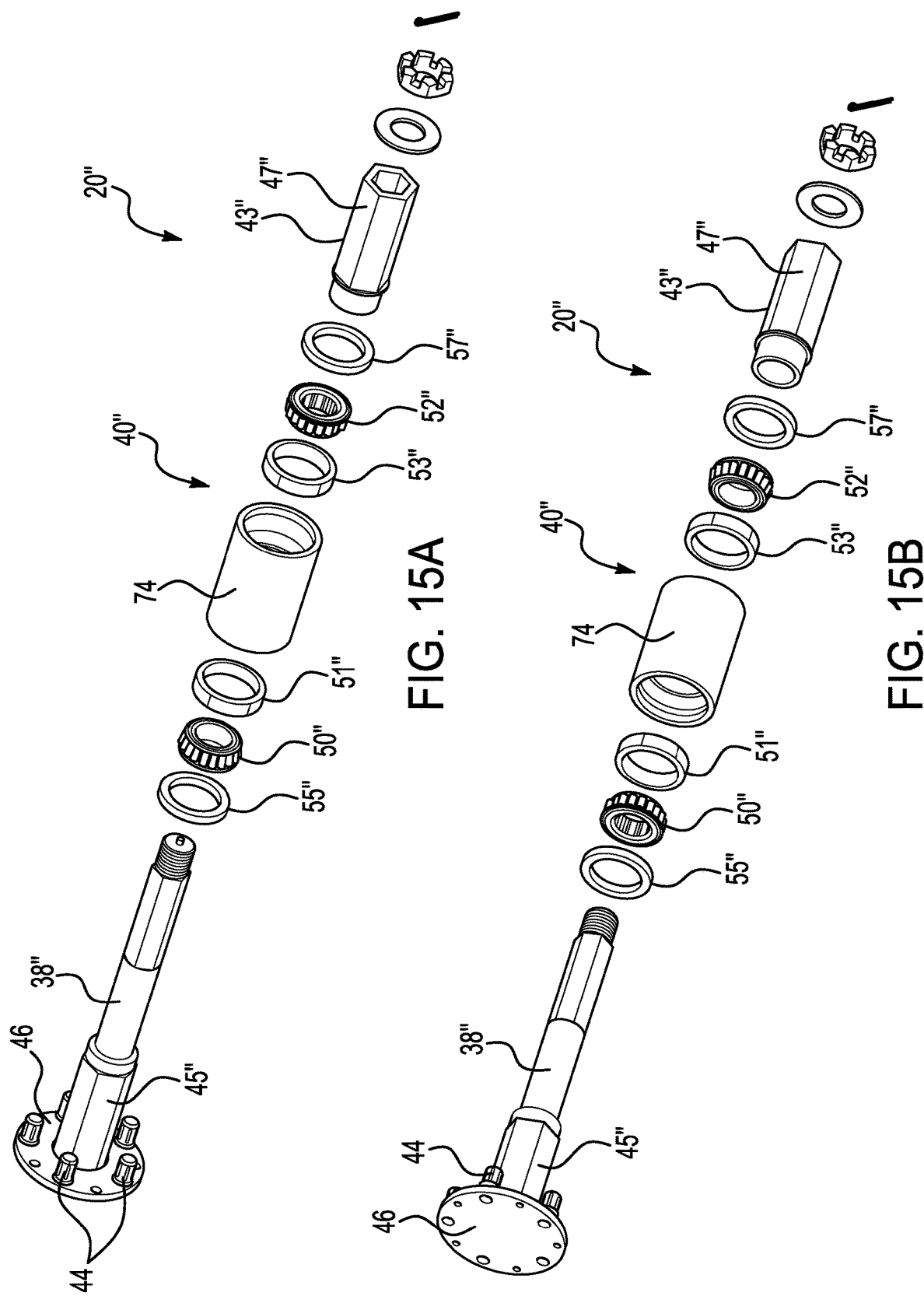
FIG. 15A is an exploded view of the hub assembly presented in FIG. 14.
FIG. 15B is another exploded view of the hub assembly presented in FIG. 14.
Figure 16:
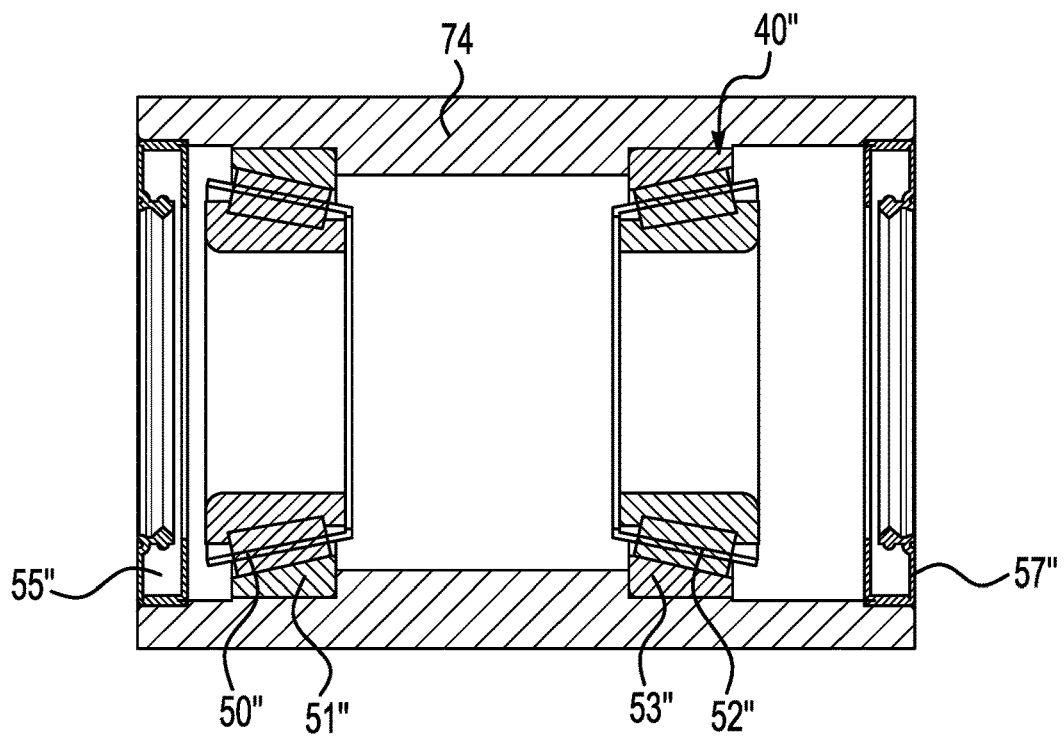
FIG. 16 is an enlarged sectional view of an embodiment of a bearing assembly of the hub assembly presented in FIG. 14.
Figure 17:
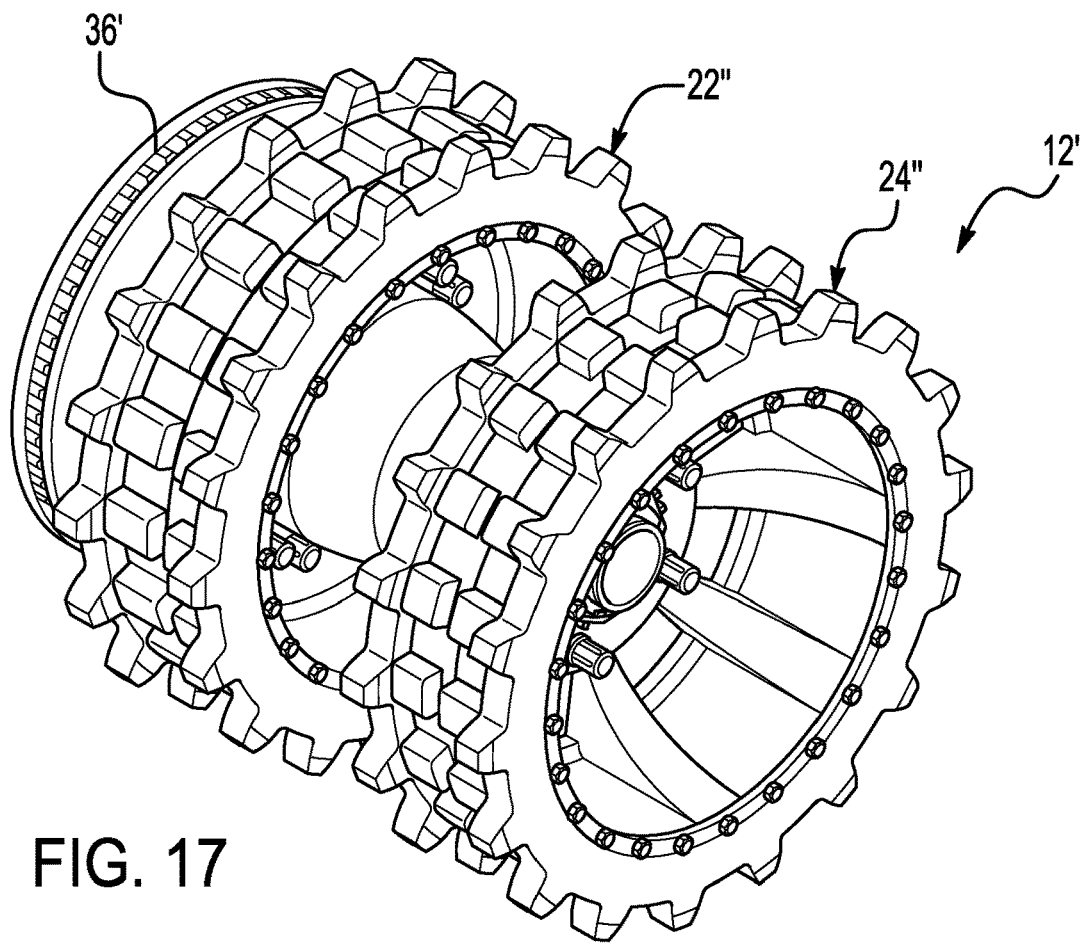
FIG. 17 is a perspective view of certain components of another embodiment of a vehicle track assembly for off-road conditions.
Figure 18:
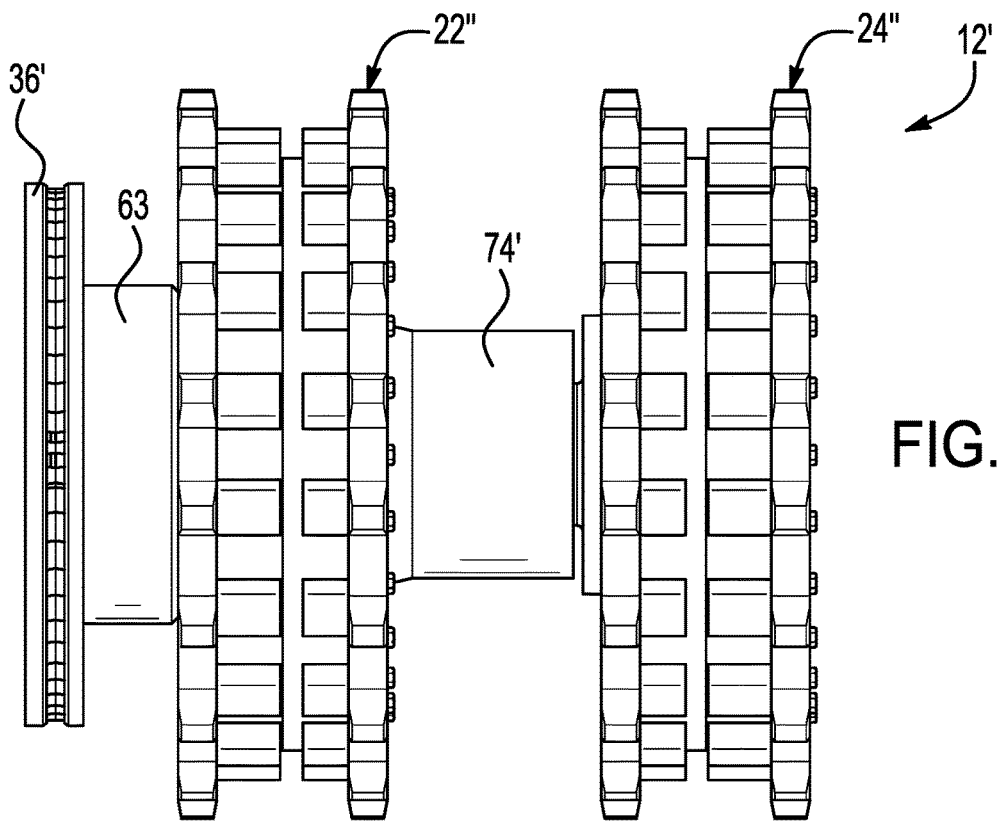
FIG. 18 is a front view of the vehicle track assembly of FIG. 17.

A third embodiment of the hub assembly 20" is presented in FIGS. 14-16. This embodiment is also intended for mounting to the rotor 36 of the automobile 18. The spindle 38" is mounted directly to the rotor 36 via the set of lug nuts 44" at the flanged end 46". The vehicle track assembly 12 is bolted on the rotor 36 via the set of lug nuts 44". The spindle 38" has a first or proximal extent 45" of hexagonal cross-sectional profile for receipt and engagement with a complementary bore of the first driver 22'. Similarly, the spindle 38" has a second or distal extent 47" of hexagonal cross-sectional profile for receipt and engagement with a complementary bore of the second driver 24'. The second extent 47" resides on a sleeve 43" that is inserted over the spindle's body and secured thereon. The sleeve 43" facilitates installation of the bearing assembly 40" and its components over the spindle 38". In other embodiments, these cross-sectional profiles could exhibit other non-circular shapes that transmit rotation from the spindle to the first and second drivers. As before, the bearing assembly 40" permits the spindle 38" to rapidly rotate amid use of the vehicle track assembly 12 with respect to, and independent of, the frame's base hub component. The bearing assembly 40" includes the first set of bearings 50" and includes the second set of bearings 52". The bearing assembly 40" further includes a first spacer or bushing 51" and a second spacer or bushing 53", and includes a first seal 55" and a second seal 57". The first and second seals 55", 57" serve to seal the open ends of the frame's base hub component against lubricant leakage from the spindle 38".

Figure 8:
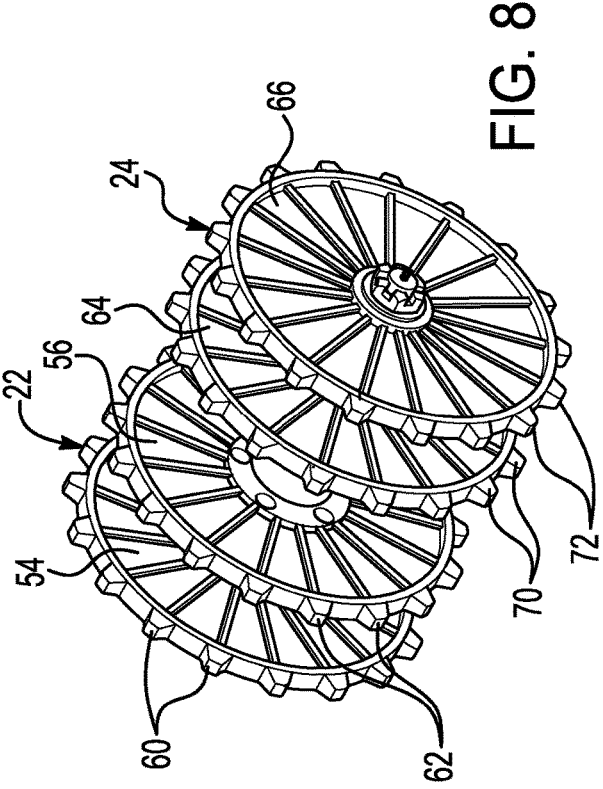
FIG. 8 is a perspective view of an embodiment of a first driver and a second driver of the vehicle track assembly.
Figure 9:
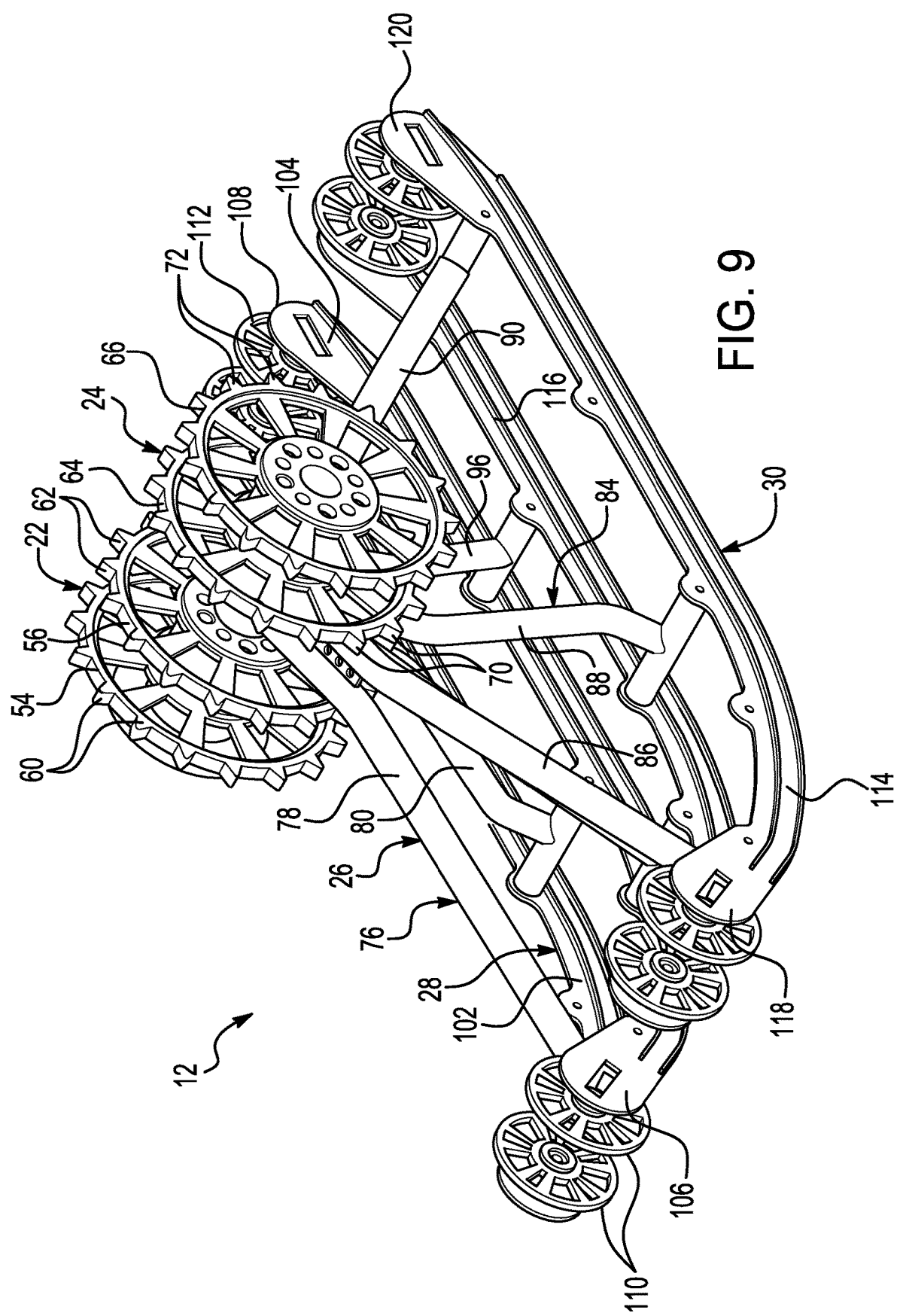
FIG. 9 is a perspective view of the vehicle track assembly, this view having tracks removed for demonstrative purposes.
Figure 10:
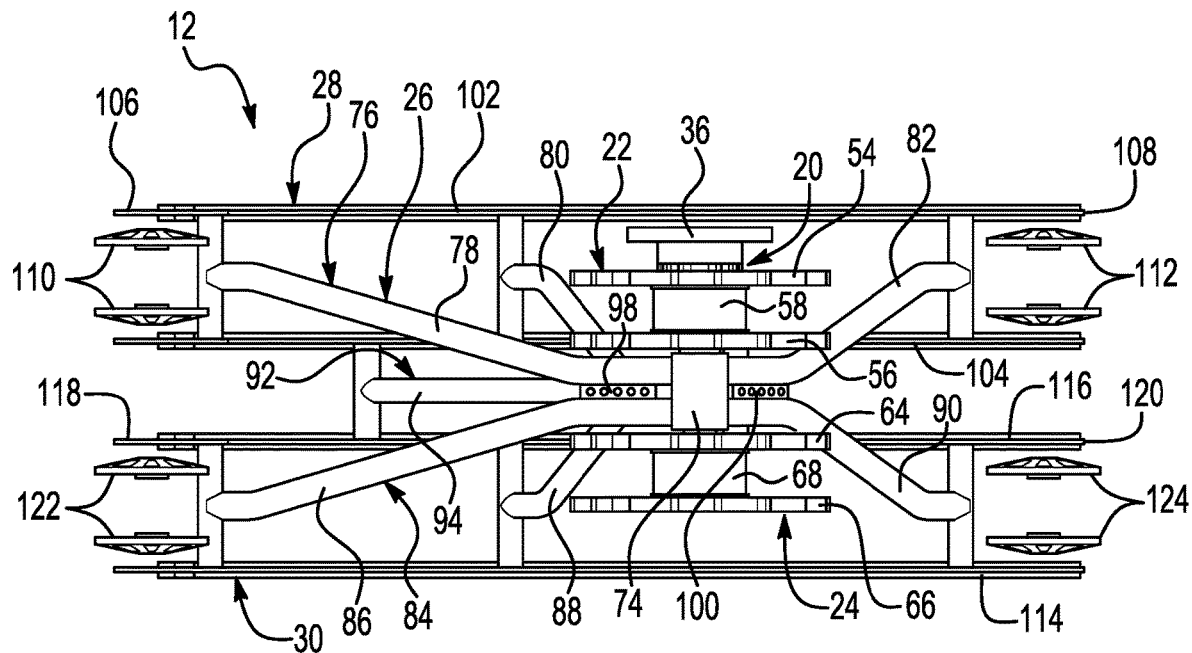
FIG. 10 is a top view of the vehicle track assembly presented in FIG. 9.

The first driver 22 is carried by and mounted to the hub assembly 20, and is driven to rotate by the hub assembly 20. The first driver 22 drives movement of the first track 32. In the case of the first embodiment of the hub assembly 20, the first driver 22 is bolted to the rotor 36; and in the case of the second embodiment of the hub assembly 20', the first driver 22 is mounted to the spindle 38' via spline-to-spline engagement. Still, in the case of the third embodiment of the hub assembly 20", a second embodiment of the first driver 22' has an internal bore 23' with a sectional profile complementing that of the spindle 38"; namely, the internal bore 23' has a hexagonal sectional profile. Referring now to FIGS. 8-10, in this embodiment the first driver 22 has an axially inboard location relative to the rotor 36 and relative to the second driver 24. The first driver 22 has a first trackring 54, a second trackring 56, and a driver hub 58 extending therebetween. The first trackring 54 has a set of first teeth 60 for meshing engagement with first slots of the first track 32. Likewise, the second trackring 56 has a set of second teeth 62 for meshing engagement with second slots of the first track 32. The first and second trackrings 54, 56 extend radially-outwardly from the driver hub 58. As set forth above, for the second embodiment of the hub assembly 20', the driver hub 58 has a set of internal splines for engagement with the first set of external splines 39'. In the example of FIG. 8, the first driver 22 is composed of a plastic material. Plastic for the first driver 22 has been shown to generate minimized heat amid use of the vehicle track assembly 12. In another example, that of FIGS. 9 and 10, the first driver 22 is composed of an aluminum material. Whatever its composition, the first driver 22 can have a monolithic or a multi-piece overall structure.

The second driver 24 is carried by and mounted to the hub assembly 20, and is driven to rotate by the hub assembly 20. Unlike the first driver 22, the second driver 24 drives movement of the second track 34. In the case of the first embodiment of the hub assembly 20, the second driver 24 is bolted to the hub 42; and in the case of the second embodiment of the hub assembly 20', the second driver 24 is mounted to the spindle 38' via spline-to-spline engagement. Still, in the case of the third embodiment of the hub assembly 20", a second embodiment of the first driver 24' has an internal bore 25' with a sectional profile complementing that of the spindle 38"; namely, the internal bore 25' has a hexagonal sectional profile. Referring now to FIGS. 8-10, in this embodiment the second driver 24 has an axially outboard location relative to the rotor 36 and relative to the first driver 22. The second driver 24 has a similar design and construction to the first driver 22. As such, the second driver 24 has a first trackring 64, a second trackring 66, and a driver hub 68 extending therebetween. The first trackring 64 has a set of first teeth 70 for meshing engagement with first slots of the second track 34. Likewise, the second trackring 66 has a set of second teeth 72 for meshing engagement with second slots of the second track 34. The first and second trackrings 64, 66 extend radially-outwardly from the driver hub 68. As set forth above, for the second embodiment of the hub assembly 20', the driver hub 68 has a set of internal splines for engagement with the second set of external splines 41'. In the example of FIG. 8, the second driver 24 is composed of a plastic material. Plastic for the second driver 24 has been shown to generate minimized heat amid use of the vehicle track assembly 12. In another example, that of FIGS. 9 and 10, the second driver 24 is composed of an aluminum material. Whatever its composition, the second driver 24 can have a monolithic or a multi-piece overall structure.

Figure 11:
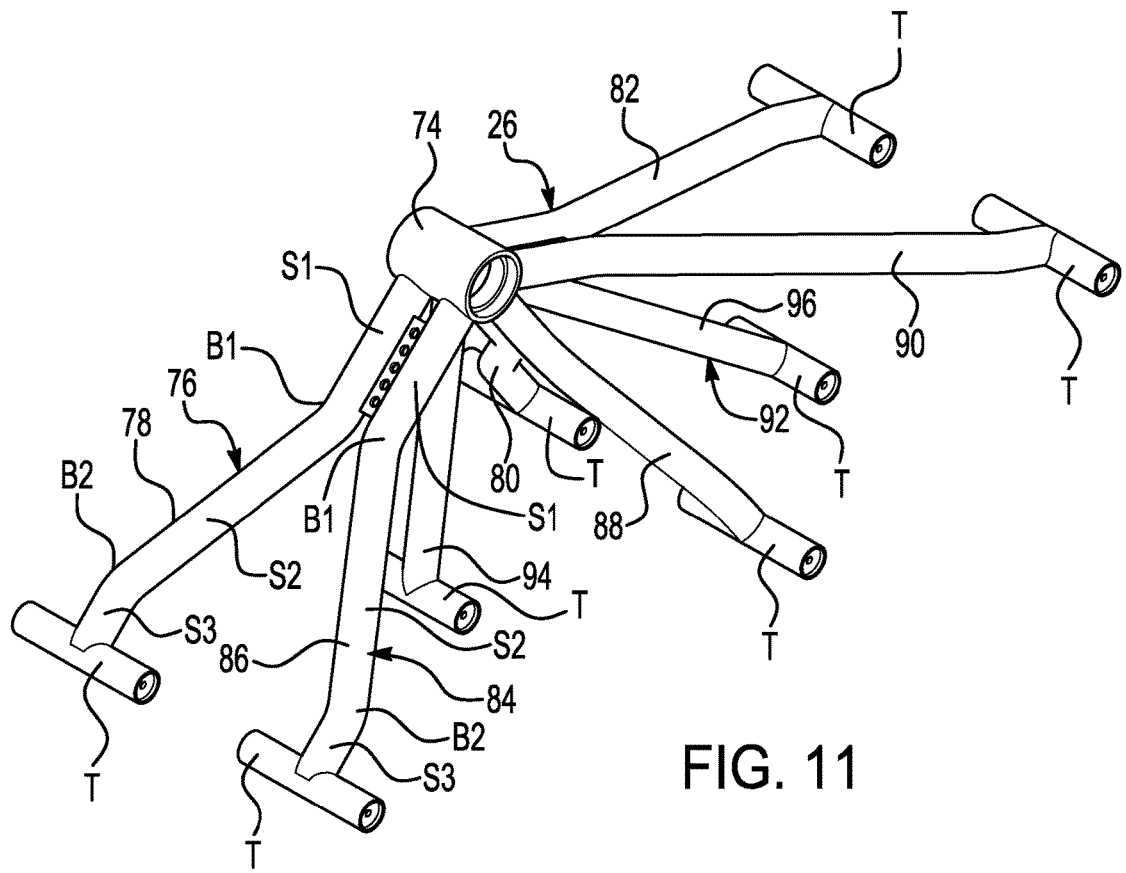
FIG. 11 is a perspective view of an embodiment of a frame with multiple frame members of the vehicle track assembly.

The frame 26 spans from the hub assembly 20 and to the first and second rails 28, 30. It provides somewhat of a skeletal support structure of the vehicle track assembly 12 that endures loads experienced by the vehicle track assembly 12 amid use. With reference to FIGS. 9-11, in this embodiment the frame 26 includes a number of discrete frame members that extend from a base hub 74 and that have discrete connections to the first rail 28, to the second rail 30, or to both of the first and second rails 28, 30. The discrete frame members can be welded to the base hub 74. The precise number of discrete frame members can vary in different embodiments and is dictated by the particular application and the expected loads encountered by the vehicle track assembly 12. In the embodiment here, a first set of frame members 76 extends from the base hub 74 and to the first rail 28. As demonstrated perhaps best by FIGS. 4 and 10, a location from which the first set of frame members 76 initially extends from the base hub 74 is at the axial mid-region M. The first set of frame members 76 exhibits an inboard location relative to the rotor 36 and has three discrete frame members: a first or forward frame member 78, a second or mid frame member 80, and a third or rearward frame member 82. As perhaps demonstrated best by the view of FIG. 11, each frame member has an overall extent (taken from the base hub 74 to the first rail 28) with a pair of bends B1, B2 that establish three linear segments S1, S2, S3. The first frame member 78 has a first connection to the first rail 28, particularly to both first side rail components of the first rail 28. Similarly, the second frame member 80 has a second connection to the first rail 28 and particularly to both first side rail components. And the third frame member 82 has a third connection to the first rail 28 and particularly to both first side rail components. The first, second, and third connections are separate connections at different locations on the first rail 28, and can each be via a tie tube T. The tie tube T can have flanges (not shown) on each of its ends for the first, second, and third connections, though need not. The tie tubes T can be welded to their respective frame member. The connections can be a bolted connection.

Furthermore, in the embodiment of FIGS. 9-11, a second set of frame members 84 extends from the base hub 74 and to the second rail 30. As demonstrated perhaps best by FIGS. 4 and 10, a location from which the second set of frame members 84 initially extends from the base hub 74 is at the axial mid-region M. The second set of frame members 84 exhibits an outboard location relative to the rotor 36 and, like the first set of frame members 76, has three discrete frame members: a first or forward frame member 86, a second or mid frame member 88, and a third or rearward frame member 90. As perhaps demonstrated best by the view of FIG. 11, each frame member has an overall extent (taken from the base hub 74 to the second rail 30) with a pair of bends B1, B2 that establish three linear segments S1, S2, S3. Indeed, the shape of the frame members 86, 88, 90 of the second set of frame members 84 mirror those of the first set of frame members 76. Together, the first frame members 78, 86 establish a first A-frame structure, the second frame members 80, 88 establish a second A-frame structure, and the third frame members 82, 90 establish a third A-frame structure. The A-frame structures facilitate resistance of the loads encountered during use of the vehicle track assembly 12. The first frame member 86 has a first connection to the second rail 30, particularly to both second side rail components of the second rail 30. Similarly, the second frame member 88 has a second connection to the second rail 30 and particularly to both second side rail components. And the third frame member 90 has a third connection to the second rail 30 and particularly to both second side rail components. The first, second, and third connections are separate connections at different locations on the second rail 30, and can each be via the tie tube T. The tie tube T can have flanges (not shown) on each of its ends for the first, second, and third connections, though need not. The tie tubes T can be welded to their respective frame member. The connections can be a bolted connection.

Also, the frame 26 in this embodiment has a third set of frame members 92. The third set of frame members 92 extends from the base hub 74 and to both of the first and second rails 28, 30. As demonstrated perhaps best by FIGS. 4 and 10, a location from which the third set of frame members 92 initially extends from the base hub 74 is at the axial mid-region M. The third set of frame members 92 exhibits a middle location relative to the first and second sets of frame members 76, 84. As perhaps shown best by FIG. 11, the third set of frame members 92 has two discrete frame members: a first or forward frame member 94 and a second or rearward frame member 96. Unlike previous frame members, the first and second frame members 94, 96 have overall extents that are singularly linear and that lack any bends. The first frame member 94 has first connections to one of the first side rail components of the first rail 28 and to one of the second side rail components of the second rail 30. In a similar manner, the second frame member 96 has second connections to one of the first side rail components of the first rail 28 and to one of the second side rail components of the second rail 30. As before, the first and second connections are separate connections at different locations on the first and second rails 28, 30, and the connections can be bolted connections. The connections can each be via the tie tube T. Still, in other embodiments, the third set of frame members 92 need not be provided.

The base hub 74 accepts insertion of a section of the hub assembly 20 and serves as a housing for the bearing assembly 40 and the first and second sets of bearings 50, 52. As perhaps shown best by the sectional views of FIGS. 3 and 4, the base hub 74 has a cylindrical exterior shape with a hollow interior spanning between a pair of circular open ends. In a similar way as previously described, the location of the base hub 74 with respect to the first and second drivers 22, 24 and with respect to the first and second tracks 32, 34—and particularly the location of extension of the frame members from the base hub 74—serves to facilitate the use of dual drivers and dual tracks in the vehicle track assembly 12 according to some embodiments; the base hub 74 and location of extension of the frame members are located and positioned at the approximate axial mid-region M established by the first and second drivers 22, 24 and the first and second tracks 32, 34. Furthermore, by way of the bearing assembly 40, the frame 26 is able to revolve to a certain degree about the base hub 74 as called for amid use of the vehicle track assembly 12. For instance, the frame 26 could be prompted to revolve upward relative to the underlying ground upon initial approach of an environmental obstacle. Lastly, and with reference to FIG. 10, a first web 98 and a second web 100 can extend laterally between the first and second sets of frame members 76, 84 to further connect and strengthen them. The first web 98 extends between the first frame members 78, 86, and the second web 100 extends between the third frame members 82, 90.

The first rail 28 guides the first track 32 as the first track 32 moves across the underlying ground. The first rail 28 has an inboard location relative to the rotor 36. With reference to FIGS. 9 and 10, in this embodiment the first rail 28 includes a first side rail 102 and a second side rail 104. The first and second side rails 102, 104 have similar designs and constructions. They extend longitudinally between first and second longitudinal ends 106, 108. To facilitate guidance of the first track 32, an elongated slide can be attached to a bottom side of the first and second side rails 102, 104 for direct and immediate contact with the first track 32; the slide can be composed of a plastic material or some other material, and can serve to present a flatter surface over which the first track 32 comes into contact with the first and second side rails 102, 104. A pair of first wheels 110 is carried by and rotatably mounted to the first and second side rails 102, 104 at the first longitudinal end 106. Likewise, a pair of second wheels 112 is carried by and rotatably mounted to the first and second side rails 102, 104 at the second longitudinal end 108. The first track 32 rides and rolls over the pair of first and second wheels 110, 112. Each of the first, second, and third frame members 78, 80, 82 of the first set of frame members 76 are connected to the first and second side rails 102, 104 of the first rail 28.

The second rail 30 guides the second track 34 as the first track 34 moves across the underlying ground. The second rail 30 has an axially outboard location relative to the rotor 36 and relative to the first rail 28. With reference to FIGS. 9 and 10, in this embodiment the second rail 30 includes a first side rail 114 and a second side rail 116. The first and second side rails 114, 116 have similar designs and constructions. They extend longitudinally between first and second longitudinal ends 118, 120. To facilitate guidance of the second track 34, an elongated slide can be attached to a bottom side of the first and second side rails 114, 116 for direct and immediate contact with the second track 34; the slide can be composed of a plastic material or some other material, and can serve to present a flatter surface over which the second track 34 comes into contact with the first and second side rails 114, 116. A pair of first wheels 122 is carried by and rotatably mounted to the first and second side rails 114, 116 at the first longitudinal end 118. Likewise, a pair of second wheels 124 is carried by and rotatably mounted to the first and second side rails 114, 116 at the second longitudinal end 120. The second track 34 rides and rolls over the pair of first and second wheels 122, 124. Each of the first, second, and third frame members 86, 88, 90 of the second set of frame members 84 are connected to the first and second side rails 114, 116 of the second rail 30.

Figure 4:
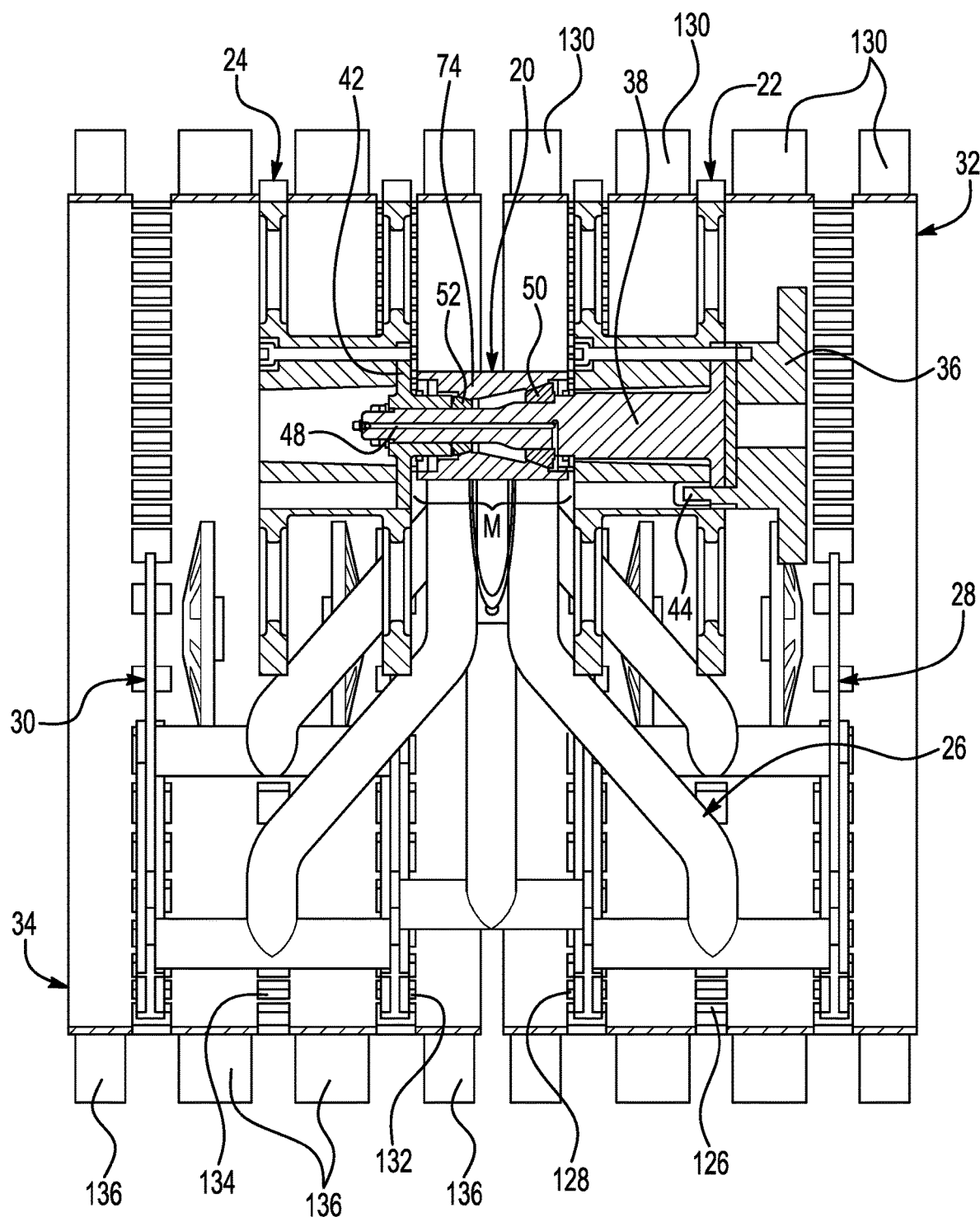
FIG. 4 is a sectional view of components of the vehicle track assembly taken at arrowed line 4-4 in FIG. 2.

The first track 32 is driven to move by the first driver 22 and comes into direct contact with the ground lying beneath the vehicle track assembly 12. Referring now to FIGS. 1 and 4, in this embodiment the first track 32 has an endless loop structure that spans around the exterior of the vehicle track assembly 12. It can be composed of a hard rubber material. A set of first slots 126 resides in the first track 32 and spans wholly therearound for meshing engagement with the set of first teeth 60 of the first trackring 54. Similarly, a set of second slots 128 resides laterally beside the set of first slots 126 and spans wholly therearound for meshing engagement with the set of second teeth 62 of the second trackring 56. Further, the first track 32 can have a pair of internal grooves for seating respectively with the first and second side rail 102, 104 of the first rail 28. At its exterior, the first track 32 has multiple first paddles 130 extending outwardly from a main body of the first track 32. The first paddles 130 can be arranged in rows and columns across the lateral and longitudinal extents of the first track 32.

Figure 2:
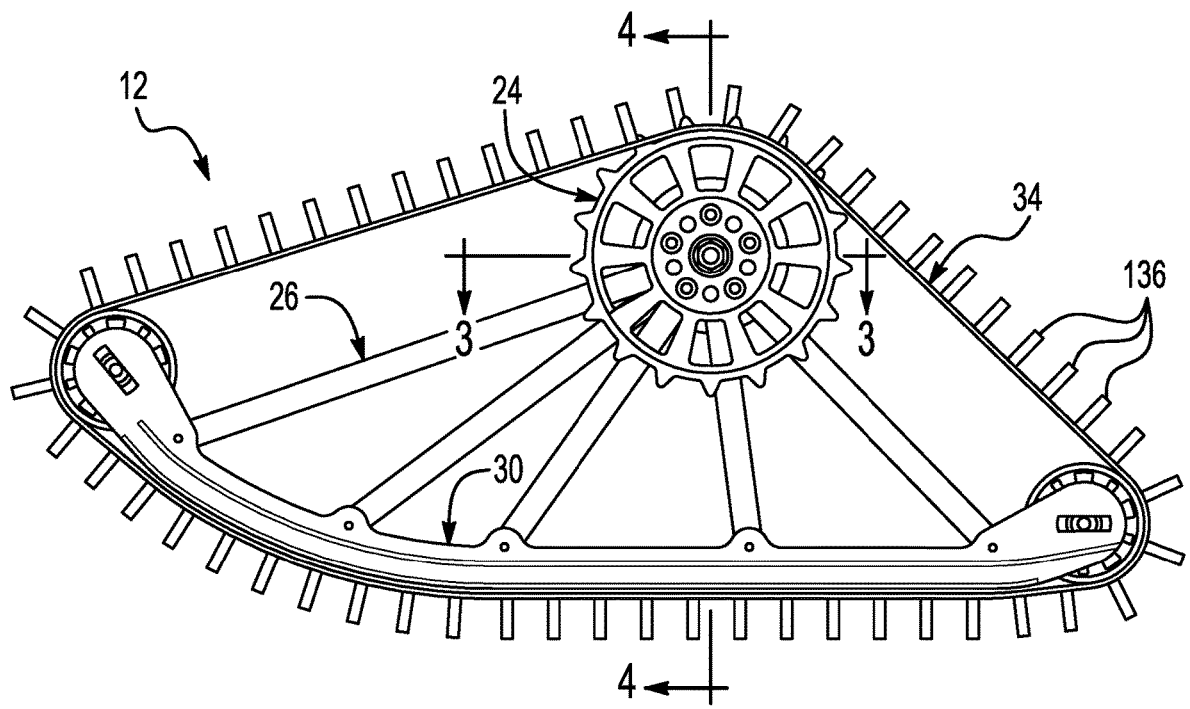
FIG. 2 is a side view of an embodiment of a vehicle track assembly for off-road conditions, this embodiment is intended for installation at a front end of the automobile.
Figure 3:
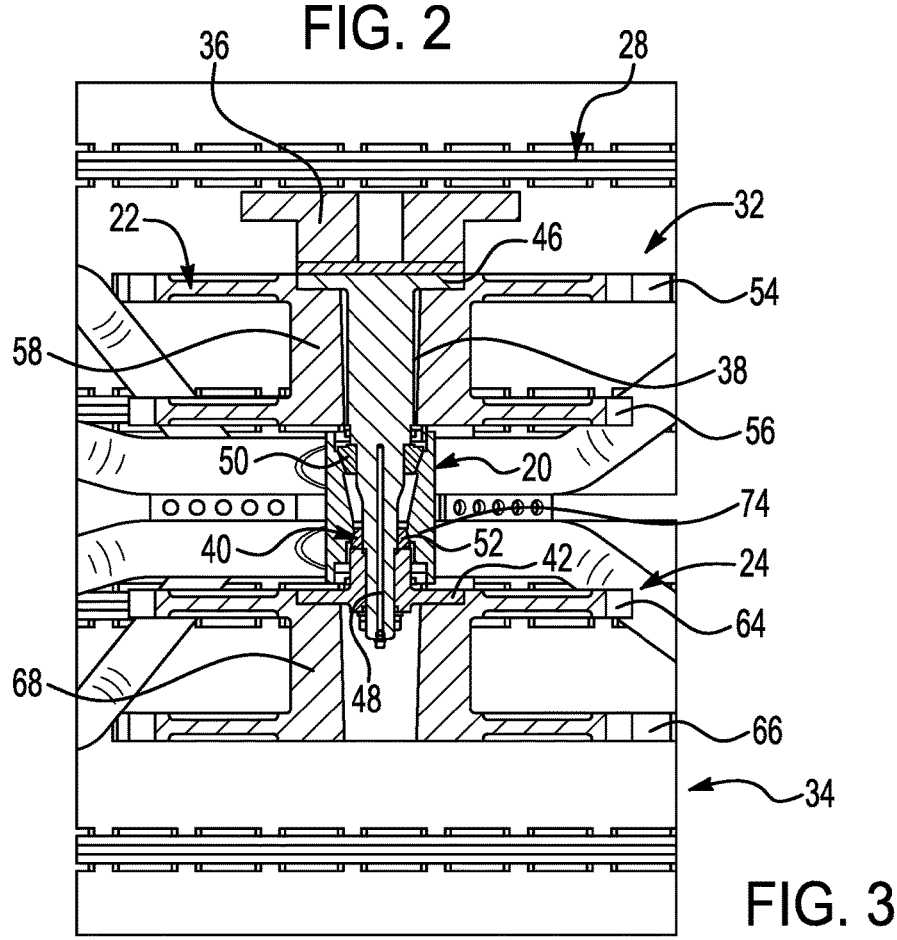
FIG. 3 is a sectional view of components of the vehicle track assembly taken at arrowed line 3-3 in FIG. 2.

The second track 34 is driven to move by the second driver 24 and comes into direct contact with the ground lying beneath the vehicle track assembly 12. Referring now to FIGS. 1, 2, and 4, in this embodiment the second track 34 has the same design and construction as the first track 32. The second track 34 has an endless loop structure that spans around the exterior of the vehicle track assembly 12. It can be composed of a hard rubber material. A set of first slots 132 resides in the second track 34 and spans wholly therearound for meshing engagement with the set of first teeth 70 of the first trackring 64. Similarly, a set of second slots 134 resides laterally beside the set of first slots 132 and spans wholly therearound for meshing engagement with the set of second teeth 72 of the second trackring 66. Further, the second track 34 can have a pair of internal grooves for seating respectively with the first and second side rail 114, 116 of the second rail 30. At its exterior, the second track 34 has multiple second paddles 136 extending outwardly from a main body of the second track 34. The second paddles 136 can be arranged in rows and columns across the lateral and longitudinal extents of the second track 34.

Together, the first and second track 32, 34 constitute the dual-track arrangement of the vehicle track assembly 12. In the embodiment presented by the figures, the dual-track arrangement improves traction and floatation of the accompanying vehicle and furnishes the ability to travel over more extreme conditions than past systems and assemblies. The first and second tracks 32, 34 maximize the area over which the vehicle track assembly 12 and the vehicle track system 10 exhibit direct and immediate confrontation with the underlying ground. This provides a greater area available to endure loads of the accompanying vehicle and those experienced amid use. Loads are hence more readily dispersed and less concentrated. Vehicles of greater weight such as SUVs can be retrofitted with the vehicle track system 10 and assemblies 12. Moreover, an increased number of paddles can make direct contact with the underlying ground. In an example embodiment, each track 32, 34 of a single front end vehicle track assembly 14 can have approximately thirty-two or more individual paddles in contact with the underlying ground, yielding a total of approximately sixty-four or more individual paddles in contact with the underlying ground for the single front end vehicle track assembly 14. Similarly, in an example embodiment, each track 32, 34 of a single rear end vehicle track assembly 16 can have approximately forty or more individual paddles in contact with the underlying ground, yielding a total of approximately eighty or more individual paddles in contact with the underlying ground for the single rear end vehicle track assembly 16. According to these example embodiments, a vehicle having a pair of front end vehicle track assemblies 14 and a pair of rear end vehicle track assemblies 16 would have a total of approximately two-hundred and eighty-eight or more individual paddles in contact with the underlying ground.

Figure 12:
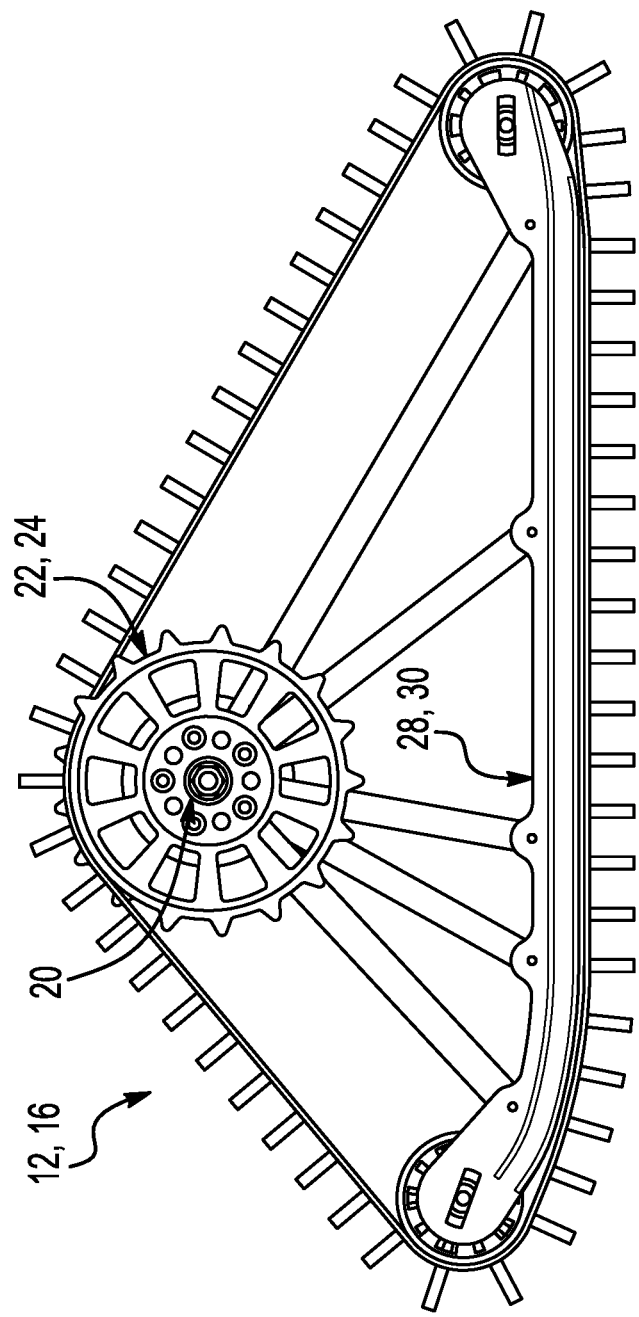
FIG. 12 is a side view of another embodiment of a vehicle track assembly for off-road conditions, this embodiment is intended for installation at a rear end of the automobile.
Figure 13:
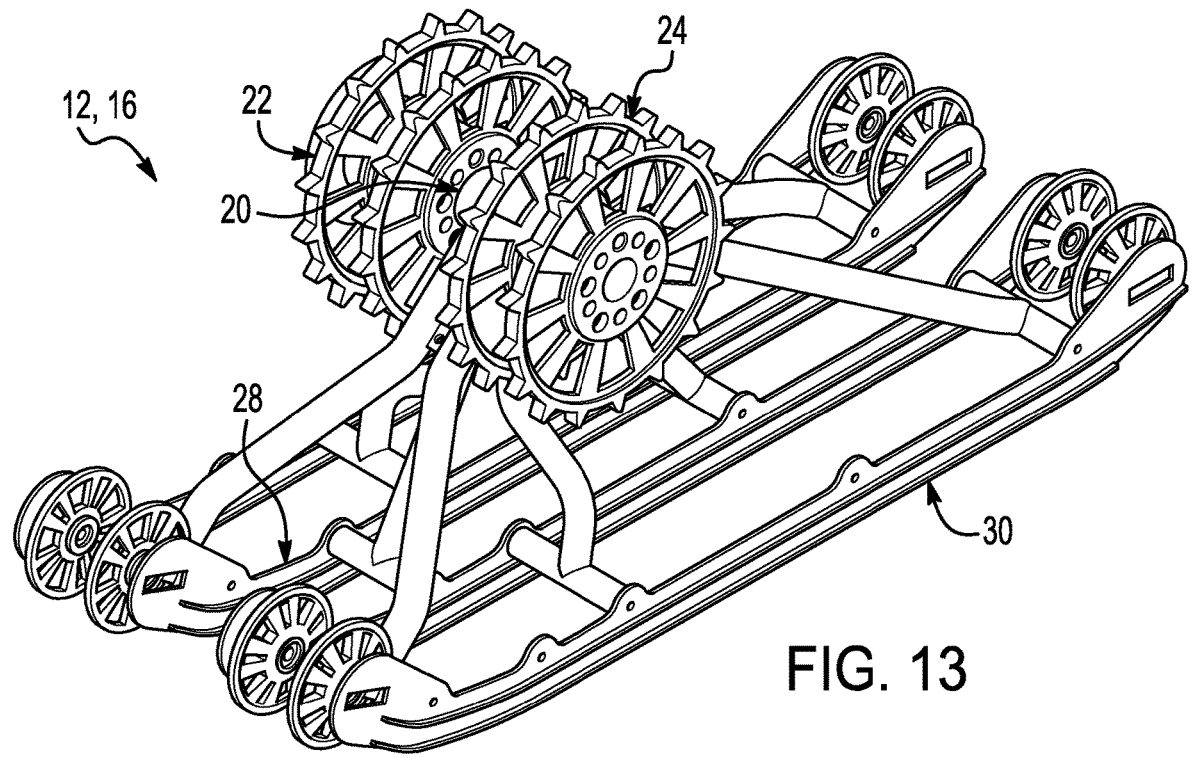
FIG. 13 is a perspective view of the vehicle track assembly, this view having tracks removed for demonstrative purposes.

As set forth above, in the embodiment presented by the figures the front end and rear end vehicle track assemblies 14, 16 have similar designs and constructions. Nevertheless, the rear end vehicle track assembly 16 is presented in FIGS. 12 and 13 to illustrate some differences. An examination of the figures reveal many of the same designs, constructions, and components as described above with reference to FIGS. 2-11. These same designs, constructions, and components are not repeated here, but may be equally applicable. One difference is a location of the hub assembly 20 and first and second drivers 22, 24 relative to the first and second rails 28, 30, and another difference is a forward region of the first and second rails 28, 30. The hub assembly 20 and first and second drivers 22, 24 are positioned closer to a forward region of the rear end vehicle track assembly 16 compared to the front end vehicle track assembly 14. And the forward region of the first and second rails 28, 30 of the rear end vehicle track assembly 16 is more level with the underlying ground compared to that of the front end vehicle track assembly 14 which has a more pronounced forward region for facilitating initial approach of environmental obstacles that are encountered.

Another embodiment of the vehicle track assembly 12' is presented in FIGS. 17-21. A fourth embodiment of the hub assembly 20''' is provided in this embodiment. The hub assembly 20''' mounts the vehicle track assembly 12' to the rotor 36' of the automobile 18, and mounts the vehicle track assembly 12' to a hub 61 of the automobile 18; still, in other example applications similar to the fourth embodiment, the hub 61 could be absent and/or there could be other vehicle components of the automobile 18 involved in the mounting of the vehicle track assembly 12'. The rotor 36' in this example has an extension with an axial portion 63 and a radial portion 65. Further, the hub 61 in this example has a radially-extending flange 67 at an exterior of a main body of the hub 61. The hub 61 spans a greater axial outboard distance than the rotor 36'. The hub assembly 20''' is designed and constructed to bring the transfer of loads exerted amid use more axially inboard and in closer proximity to the rotor 36' and in closer proximity to the hub 61. Cantilever loads experienced at the rotor 36', hub 61, and/or other vehicle component are hence minimized. It has been found that loads may be more effectively endured in this way. At least some loads exerted amid use of the vehicle track assembly 12' are transmitted from the frame 26, through the base hub 74', and to the spindle 38''' via the first and second sets of bearings 50''', 52'''.

Figure 19:
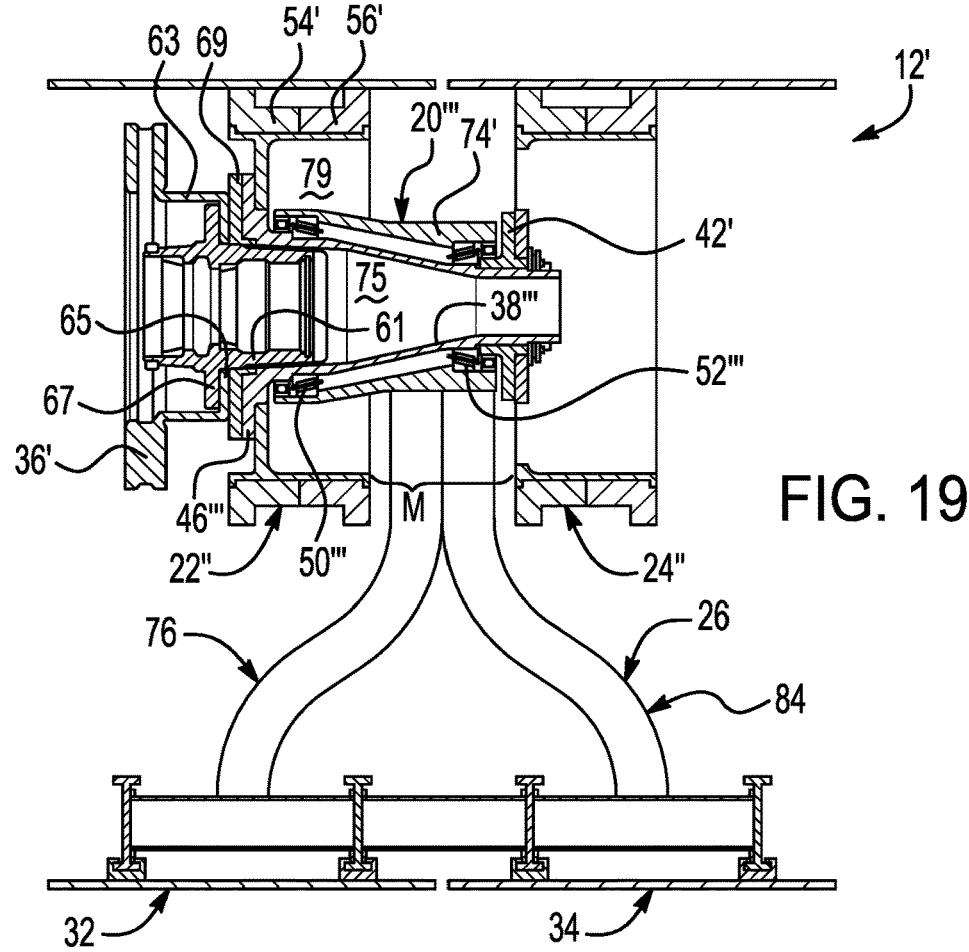
FIG. 19 is a sectional view of certain components of the vehicle track assembly of FIG. 17.
Figure 20:
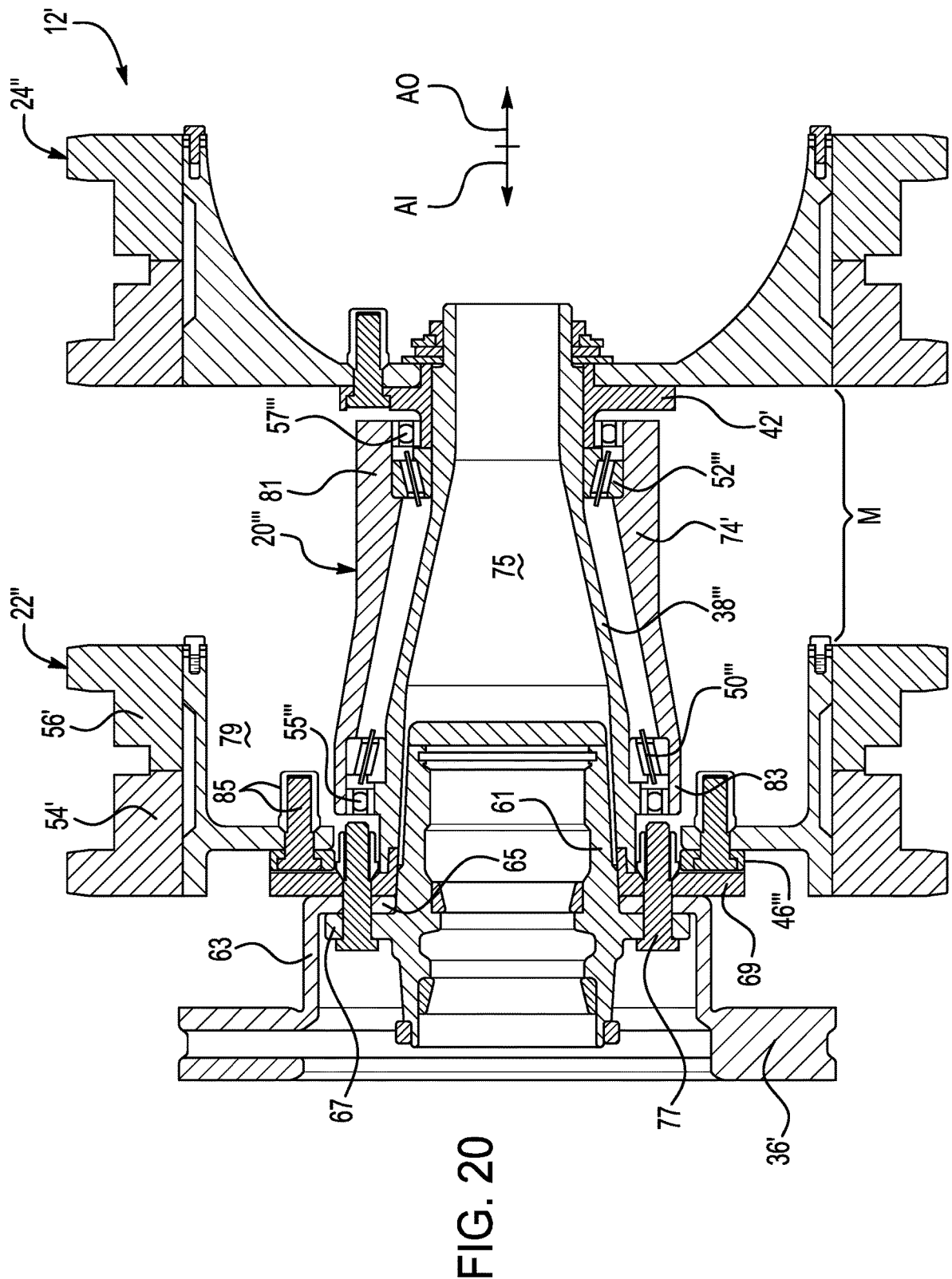
FIG. 20 is a sectional view of the vehicle track assembly of FIG. 17.
Figure 21A:
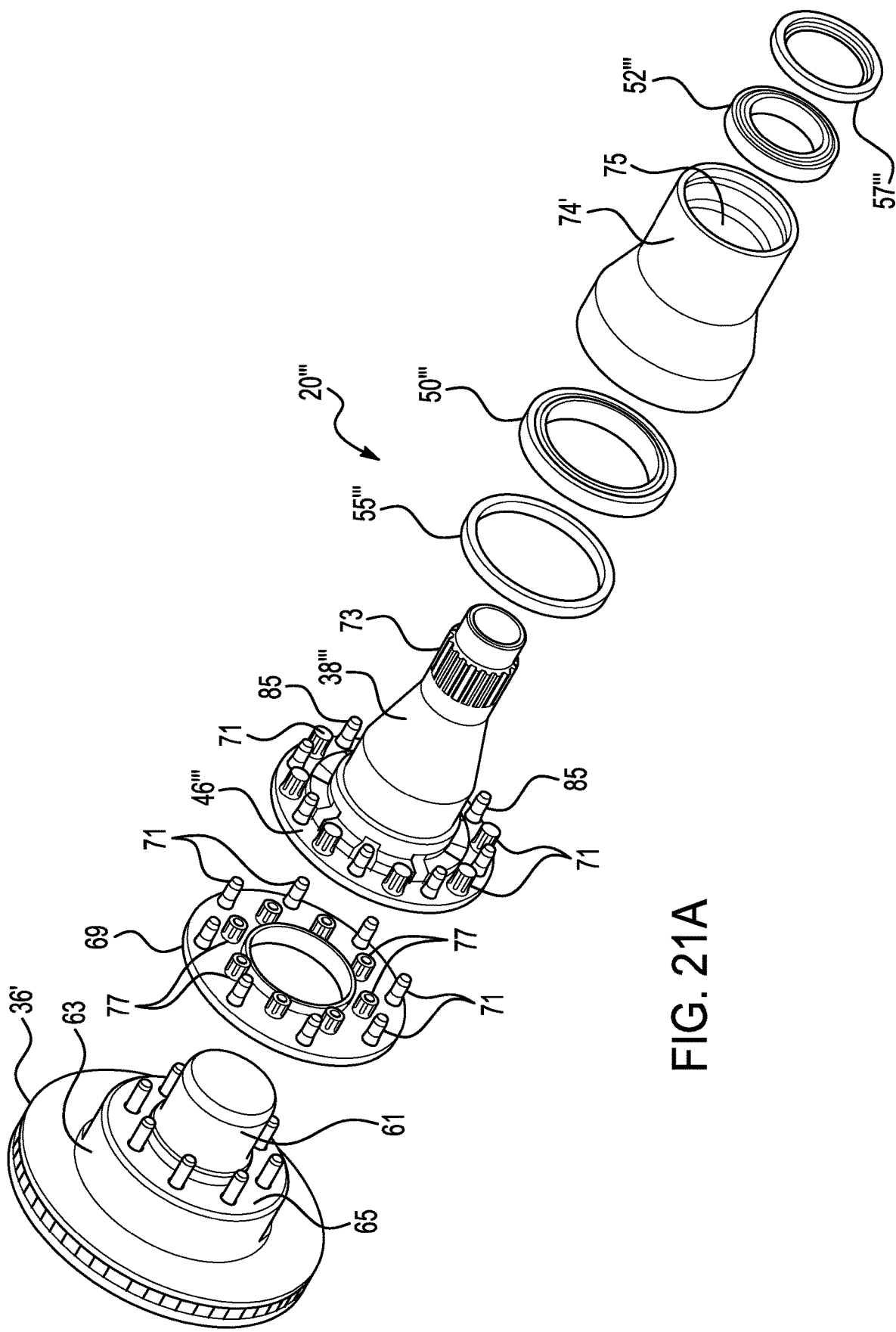
FIG. 21A is an exploded view of a hub assembly of the vehicle track assembly of FIG. 17.
Figure 21B:
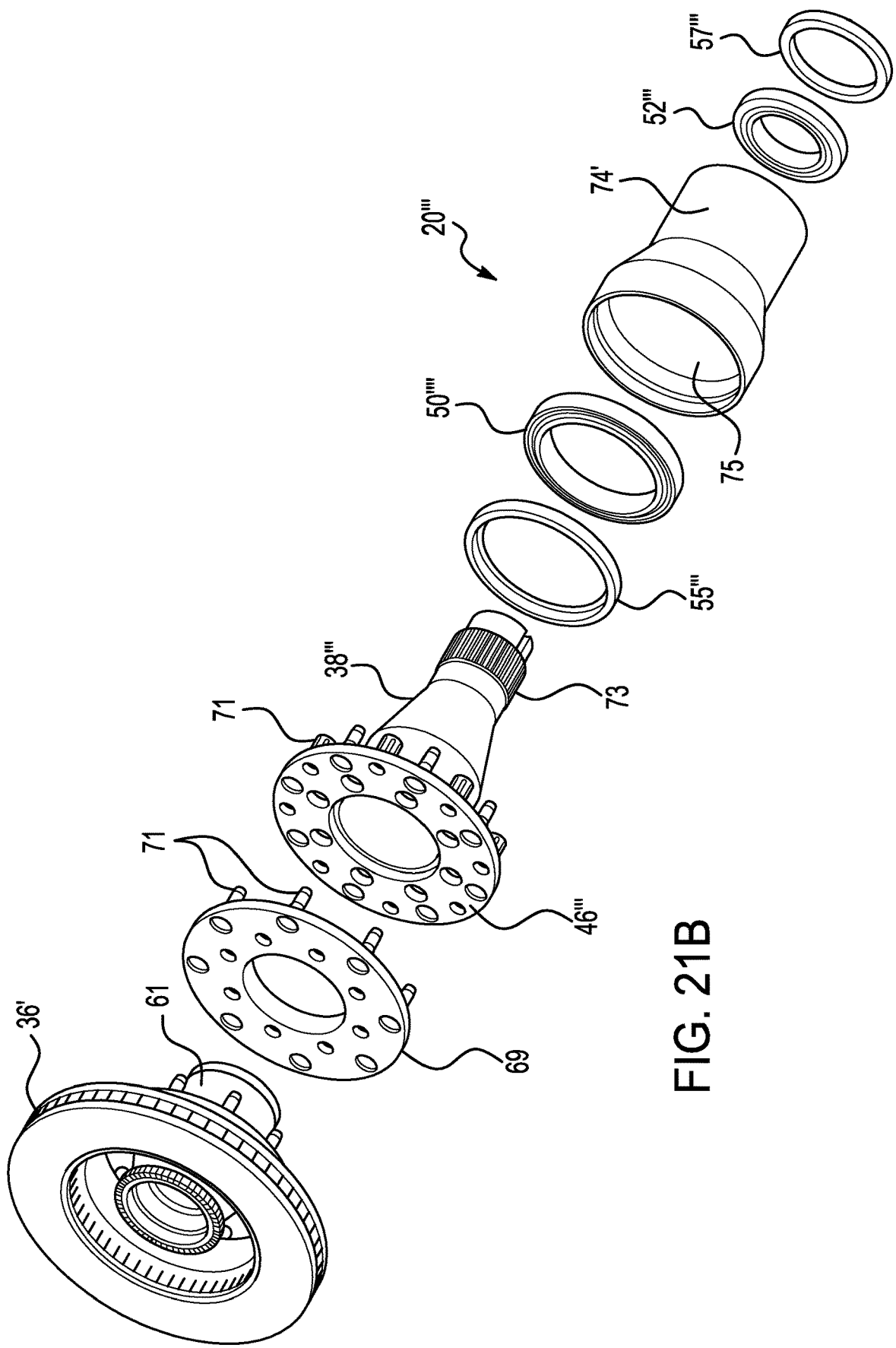
FIG. 21B is another exploded view of the hub assembly of the vehicle track assembly of FIG. 17.

With reference now to FIGS. 19-21, the spindle 38''' is mounted directly to a spacer 69 via a first set of bolts and lug nuts 71, establishing a first bolted connection therebetween at a flanged end 46''' of the spindle 38'''. Opposite the flanged end 46''', the spindle 38''' has a set of external splines 73 for engagement with a set of internal splines of the hub 42'. The spindle 38''' has a hollow interior 75 that spans from a proximal open end at the flanged end 46''', and to a distal open end adjacent the external splines 73. At the proximal open end, the spindle 38''' has a larger diameter in order to fit around an exterior of the hub 61. The hub 61 is received in the interior 75 via the proximal open end, and the spindle 38''' and hub 61 exhibit an axial overlap arrangement relative to each other. At the distal open end, the spindle 38''' has a comparatively smaller diameter than the proximal open end. Between the open ends, the spindle's wall tapers and grows narrower. The spacer 69 may be included as a component of the hub assembly 20'''; still, in other embodiments the spacer 69 may not be provided. The spacer 69 facilitates the transfer of loads axially inboard and in closer proximity to the rotor 36' and to the hub 61. The spacer 69 is mounted directly to the rotor 36' and to the hub 61 via a second set of bolts and lug nuts 77, establishing a second bolted connection therebetween. The second bolted connection is established at the radially-extending flange 67 of the hub 61, and at the radial portion 65 of the rotor 36'. The second bolted connection and the second set of bolts and lug nuts 77 have a radial location that is radially inboard with respect to the first bolted connection and the first set of bolts and lug nuts 71. This arrangement provides ready access to the first set of bolts and lug nuts 71 during assembly and installation procedures of the vehicle track assembly 12' to the automobile 18. The spacer 69 has an annular shape, and is received over the hub 61 in assembly where the spacer 69 is situated axially between the flanged end 46''' of the spindle 38''' and the radial portion 65 of the rotor 36'.

As set forth, the bearing assembly 40''' and the first and second sets of bearings 50''', 52''' play a role in the transfer and transmission of loads exerted amid use of the vehicle track assembly 12'. The second set of bearings 52''' has a similar axial location in this embodiment as in previous embodiments. With particular reference to FIGS. 19 and 20, the second set of bearings 52''' is located and positioned at the axial mid-region M. At this location, the second set of bearings 52''' exhibits an axial overlap arrangement with the location from which the frame 26 and the first and second sets of frame members 76, 84 are connected and initially extend from the base hub 74' (in the fourth embodiment, the frame 26 lacks the third set of frame members 92). The first set of bearings 50''' has an axial location in this embodiment that differs in comparison to the previous embodiments. Its axial location serves to facilitate the transfer of loads axially inboard to a greater degree and in closer proximity to the rotor 36' and in closer proximity to the hub 61. The first set of bearings 50''' is located axially inboard of the axial mid-region M, and lacks the axial overlap arrangement with the frame 26 had by the second set of bearings 52'''. The first set of bearings 50''' resides within a recessed interior 79 of the first driver 22'', and exhibits an axial overlap arrangement with the first driver 22'' and with the first and second trackrings 54', 56'. Moreover, the first set of bearings 50''' axially overlaps and radially surrounds an axial extent and exterior of the hub 61. In order to fit around the exterior of the hub 61, the first set of bearings 50''' has a first diameter that is greater than a second diameter of the second set of bearings 52'''. Further, the hub assembly 20''' of this fourth embodiment includes the first seal 55''' and the second seal 57'''.

The base hub 74' somewhat complements the shape of the spindle 38'''. At a proximal open end, the base hub 74' has a larger diameter in order to fit around an exterior of the hub 61. The hub 61 is received in an interior via the proximal open end, and the base hub 74' and hub 61 exhibit an axial overlap arrangement relative to each other. The proximal open end of the base hub 74' resides within the recessed interior 79 of the first driver 22'', and exhibits an axial overlap arrangement with the first driver 22'' and with the first and second trackrings 54', 56'. At a distal open end, the base hub 74' has a comparatively smaller diameter than the proximal open end. Between the open ends, the base hub's wall tapers and grows narrower. In order to brace loads exerted amid use, a first wall portion 81 adjacent the distal open end and adjacent the second set of bearings 52''' has a radial thickness that is greater than a radial thickness of a second wall portion 83 adjacent the proximal open and adjacent the first set of bearings 50'''. The first wall portion 81 is a thickened wall portion compared to the second wall portion 83. Lastly, the first driver 22'' is mounted directly to the flanged end 46''' of the spindle 38''' via a third set of bolts and lug nuts 85, establishing a third bolted connection therebetween.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle track assembly for off-road conditions, the vehicle track assembly comprising:
    a hub assembly;
    a first driver carried by said hub assembly and rotatable with said hub assembly;
    a second driver carried by said hub assembly and rotatable with said hub assembly;
    a frame spanning from said hub assembly, said frame having a first set of frame members and a second set of frame members;
    a first rail connected to said first set of frame members;
    a second rail connected to said second set of frame members;
    a first track with a plurality of first paddles, said first track driven to move via said first driver and guided over said first rail; and
    a second track with a plurality of second paddles, said second track driven to move via said second driver and guided over said second rail;
    wherein said frame has a base hub that receives said hub assembly, said first set of frame members extends from said base hub and said second set of frame members extends from said base hub.

2. The vehicle track assembly as set forth in claim 1, wherein said hub assembly is driven to rotate by a vehicle component and drives rotation of said first driver and drives rotation of said second driver.

3. The vehicle track assembly as set forth in claim 1, wherein said hub assembly includes a spindle and at least one set of bearings.

4. The vehicle track assembly as set forth in claim 1, wherein said hub assembly carries said frame and includes at least one set of bearings, and said hub assembly revolves relative to said frame via said at least one set of bearings amid use of the vehicle track assembly.

5. The vehicle track assembly as set forth in claim 1, wherein said first driver has a first pair of trackrings and said second driver has a second pair of trackrings, said first pair of trackrings engaging said first track and said second pair of trackrings engaging said second track.

6. The vehicle track assembly as set forth in claim 1, wherein said base hub has a general location at an axial mid-region established by said first driver and by said second driver.

7. The vehicle track assembly as set forth in claim 1, wherein a first location of extension of said first set of frame members from said base hub is generally at an axial mid-region established by said first driver and by said second driver, and a second location of extension of said second set of frame members from said base hub is generally at said axial mid-region.

8. The vehicle track assembly as set forth in claim 1, wherein said frame spans from said hub assembly at a location that is generally at an axial mid-region established by said first driver and by said second driver.

9. A vehicle track system comprising a plurality of the vehicle track assemblies as set forth in claim 1.

10. A vehicle track assembly for off-road conditions, the vehicle track assembly comprising:
    a spindle and at least one set of bearings;
    a frame having a base hub, said base hub housing at least a section of said spindle and housing said at least one set of bearings, said frame extending from said base hub;
    a first driver rotatable with said spindle;
    a second driver rotatable with said spindle;
    a first rail connected to said frame;
    a second rail connected to said frame;
    a first track with a plurality of first paddles, said first track driven to move via said first driver;
    a second track with a plurality of second paddles, said second track driven to move via said second driver; and
    a spacer situated axially between said spindle and a vehicle component, said spacer has a first bolted connection to said vehicle component, and said spacer has a second bolted connection to said spindle.

11. The vehicle track assembly as set forth in claim 10, further comprising a hub assembly, said hub assembly including said spindle and including said at least one set of bearings.

12. The vehicle track assembly as set forth in claim 10, wherein said frame extends from said base hub at a location that is generally at an axial mid-region established by said first driver and by said second driver.

13. The vehicle track assembly as set forth in claim 10, wherein said at least one set of bearings has a first axial location that is overlapped by a second axial location of said first driver.

14. The vehicle track assembly as set forth in claim 13, wherein said at least one set of bearings is situated radially between said spindle and said base hub.

15. The vehicle track assembly as set forth in claim 10, wherein said at least one set of bearings includes a first set of bearings and a second set of bearings, said first and second sets of bearings are situated radially between said spindle and said base hub, said first set of bearings has a first axial location that is overlapped by a second axial location of said first driver, and said second set of bearings has a third axial location that is axially outboard of said first axial location.

16. The vehicle track assembly as set forth in claim 15, wherein said first axial location of said first set of bearings axially overlaps an axial extent of a vehicle component.

17. A vehicle track hub assembly, comprising:
- a spindle;
- a frame base hub;
- a first set of bearings situated radially between said spindle and said frame base hub;
- a second set of bearings situated radially between said spindle and said frame base hub;
- a first driver rotatable with said spindle;
- a second driver rotatable with said spindle; and
- a spacer situated axially between said spindle and a vehicle component, said spacer has a first bolted connection to said vehicle component, said spacer has a second bolted connection to said spindle, said first bolted connection is located radially inboard of said second bolted connection;
- wherein, in an assembled state, said first set of bearings is axially overlapped by said first driver and said second set of bearings is positioned axially outboard of said first set of bearings.

18. The vehicle track hub assembly as set forth in claim 17, wherein said first set of bearings has a first diameter, said second set of bearings has a second diameter, and said first diameter is greater than said second diameter.

19. The vehicle track hub assembly as set forth in claim 17, wherein said first set of bearings axially overlaps an axial extent of a vehicle component.

20. The vehicle track hub assembly as set forth in claim 17, further comprising a frame, said frame extends from said frame base hub at a location that axial overlaps said second set of bearings and that lacks axial overlap with said first set of bearings.

21. A vehicle track hub assembly, comprising:
- a spindle;
- a frame base hub;
- a first set of bearings situated radially between said spindle and said frame base hub;
- a second set of bearings situated radially between said spindle and said frame base hub;
- a first driver rotatable with said spindle;
- a second driver rotatable with said spindle; and
- a frame, said frame extends from said frame base hub at a location that axial overlaps said second set of bearings and that lacks axial overlap with said first set of bearings;
- wherein, in an assembled state, said first set of bearings is axially overlapped by said first driver and said second set of bearings is positioned axially outboard of said first set of bearings.

* * * * *